(12) United States Patent
Itou et al.

(10) Patent No.: US 11,463,038 B2
(45) Date of Patent: Oct. 4, 2022

(54) CONTROL DEVICE FOR MULTI-PHASE CONVERTER, MULTI-PHASE CONVERTER SYSTEM, AND POWER SUPPLY SYSTEM

(71) Applicant: TOYOTA JIDOSHA KABUSHIKI KAISHA, Toyota (JP)

(72) Inventors: Masayuki Itou, Sunto-gun (JP); Tomohiko Kaneko, Ashigarakami-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 17/109,343

(22) Filed: Dec. 2, 2020

(65) Prior Publication Data

US 2021/0194404 A1  Jun. 24, 2021

(30) Foreign Application Priority Data

Dec. 24, 2019  (JP) .............................. JP2019-233409

(51) Int. Cl.
| | |
|---|---|
| *H02M 1/04* | (2006.01) |
| *H02M 3/10* | (2006.01) |
| *H02M 5/20* | (2006.01) |
| *H02P 27/08* | (2006.01) |
| *B60L 50/60* | (2019.01) |
| *B60L 50/70* | (2019.01) |

(52) U.S. Cl.
CPC ............ *H02P 27/085* (2013.01); *B60L 50/60* (2019.02); *B60L 50/70* (2019.02)

(58) Field of Classification Search
CPC .................................. H02M 3/10; H02M 5/20
See application file for complete search history.

(56) References Cited

U.S. PATENT DOCUMENTS

| | | | |
|---|---|---|---|
| 2018/0251036 A1* | 9/2018 | Tapadia | ................... H02P 5/74 |
| 2020/0358359 A1* | 11/2020 | Gagas | ..................... H02M 1/08 |

FOREIGN PATENT DOCUMENTS

| | | |
|---|---|---|
| DE | 10 2013 001 564 A1 | 8/2013 |
| JP | 2014-030285 A | 2/2014 |
| JP | 2017-060303 A | 3/2017 |

* cited by examiner

*Primary Examiner* — Muhammad S Islam
*Assistant Examiner* — Charles S Laughlin
(74) *Attorney, Agent, or Firm* — Finnegan, Henderson, Farabow, Garrett & Dunner, LLP

(57) ABSTRACT

A control device for a multi-phase converter including converter circuits of m phases of which each includes a switching element includes: a driven phase number control unit configured to control the multi-phase converter in n-phase driving or m-phase driving; a storage unit configured to store first and second patterns; a selection unit configured to select the first or second pattern while the multi-phase converter is stopped, an on/off control unit configured to perform on/off control on the switching elements of the number of driven phases; and a prediction unit configured to predict a predicted correlation value which is correlated with a time ratio which is a ratio of a time in which control in the m-phase driving is predicted to be performed to a time in which control in the n-phase driving is predicted to be performed in a predetermined time.

10 Claims, 27 Drawing Sheets

THREE-PHASE DRIVING BASED ON PATTERN A

THREE-PHASE DRIVING BASED ON PATTERN B

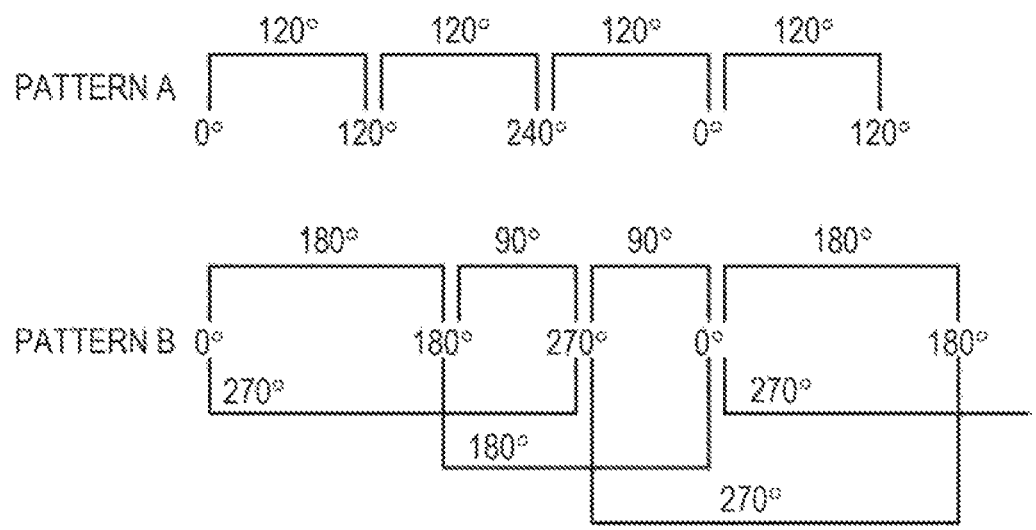

THREE-PHASE DRIVING BASED ON PATTERN C

TWO-PHASE DRIVING BASED ON PATTERN C

| | PHASE | RIPPLE CURRENT | | |
|---|---|---|---|---|
| | | ONE-PHASE DRIVING | TWO-PHASE DRIVING | THREE-PHASE DRIVING |
| PATTERN A | 0°, 120°, 240° | 1 | 2/3 | 1/3 |
| PATTERN C | 0°, 140°, 250° | 1 | 4/9 | 5/9 |
| PATTERN B | 0°, 180°, 270° | 1 | 0 | 1 |

THREE-PHASE DRIVING BASED ON PATTERN D

TWO-PHASE DRIVING BASED ON PATTERN D

| | PHASE | RIPPLE CURRENT | | |
| --- | --- | --- | --- | --- |
| | | ONE-PHASE DRIVING | TWO-PHASE DRIVING | THREE-PHASE DRIVING |
| PATTERN A | 0°, 120°, 240° | 1 | 2/3 | 1/3 |
| PATTERN C | 0°, 140°, 250° | 1 | 4/9 | 5/9 |
| PATTERN D | 0°, 160°, 260° | 1 | 2/9 | 7/9 |
| PATTERN B | 0°, 180°, 270° | 1 | 0 | 1 |

CONTROL DEVICE FOR MULTI-PHASE CONVERTER, MULTI-PHASE CONVERTER SYSTEM, AND POWER SUPPLY SYSTEM

INCORPORATION BY REFERENCE

The disclosure of Japanese Patent Application No. 2019-233409 filed on Dec. 24, 2019 including the specification, drawings and abstract is incorporated herein by reference in its entirety.

BACKGROUND

1. Technical Field

The disclosure relates to a control device for a multi-phase converter, a multi-phase converter system, and a power supply system.

2. Description of Related Art

A multi-phase converter including converter circuits in a plurality of phases is known. In Japanese Unexamined Patent Application Publication No. 2017-60303 (JP 2017-60303 A), when the number of driven phases of the converter circuits is changing, it is possible to curb a ripple current in the multi-phase converter and to decrease a loss by controlling the phases such that phase differences of switching of the converter circuits are substantially constant. In Japanese Unexamined Patent Application Publication No. 2014-30285 (JP 2014-30285 A), phases of switching of converter circuits are set in advance and switching of some converter circuits is stopped in accordance with a current command value.

SUMMARY

In JP 2017-60303 A, since it is necessary to change the phases of switching elements to correspond to the number of driven phases while changing the number of driven phases of the converter circuits, control of the phases of the switching elements is complicated. In JP 2014-30285 A, since switching of some converter circuits is stopped, a ripple current in the multi-phase converter increases and the loss may increase.

The disclosure provides a control device for a multi-phase converter, a multi-phase converter system, and a power supply system that can curb an increase in loss due to a ripple current with simple control.

According to an aspect of the disclosure, there is provided a control device for a multi-phase converter including converter circuits of m (where m is an integer equal to or greater than 3) phases of which each includes a switching element and which are connected in parallel to each other. The control device includes: a driven phase number control unit configured to increase the number of driven phases of the converter circuits by increasing the number of switching elements on which on/off control is performed as a current value input to the multi-phase converter increases and to control the multi-phase converter in n-phase driving in which the number of driven phases is it (where n is an integer less than m and equal to or greater than 2 and is an integer other than a divisor of m) or m-phase driving in which the number of driven phases is m; a storage unit configured to store first and second patients which are phase patterns in which on timings of the switching elements of m phases are defined; a selection unit configured to select the first or second pattern while the multi-phase converter is stopped; an on/off control unit configured to perform the on/off control on the switching elements of the number of driven phases based on the phases defined in the selected first or second pattern on the condition that a period and a duty ratio are substantially the same, and a prediction unit configured to predict a predicted correlation value which is correlated with a time ratio which is a ratio of a time in which control in the m-phase driving is predicted to be performed to a time in which control in the n-phase driving is predicted to be performed in a predetermined time. An absolute value of a difference between a maximum value of a phase difference between two switching elements which are defined to be sequentially turned on in the n-phase driving based on the second pattern and 360°/n is less than an absolute value of a difference between a maximum value of a phase difference between two switching elements which are defined to be sequentially turned on in the n-phase driving based on the first pattern and 360°/n. The selection unit is configured to select the first pattern when the predicted correlation value indicates that the time ratio is equal to or greater than a first threshold value and to select the second pattern when the predicted correlation value indicates that the time ratio is less than a second threshold value equal to or less than the first threshold value. The on/off control unit is configured to stop on/off control on the switching elements of (m-n) phases in the n-phase driving based on the second pattern. The switching elements are classified into a plurality of combinations such that each of the combinations is composed of three switching elements that are defined to be sequentially turned on in the m-phase driving based on the second pattern When (m-n)=1, the switching element of (m-n) phase on which the on/off control is stopped in the n-phase driving based on the second pattern is the switching element which is turned on between the switching element which is firstly turned on and the switching element which is finally turned on out of the three switching elements in a combination having a phase difference that is smallest among the plurality of combinations, the phase difference being a phase difference between the switching element which is firstly turned on and the switching element which is finally turned on. When (m-n)≥2, the switching elements of (m-n) phases on which the on/off control is stopped in the n-phase driving based on the second pattern are switching elements that are other than a combination of two switching elements which are defined to be sequentially turned on in the m-phase driving based on the second pattern, and that are each turned on between the switching element which is firstly turned on and the switching element which is finally turned on out of the three switching elements in a corresponding one of (m-n) combinations out of the plurality of combinations, the (m-n) combinations being selected in ascending order of the phase difference between the switching element which is firstly turned on and the switching element which is finally turned on. Note that, in this specification, a switching element of one phase in a case where (m-n)=1, and switching elements of two or more phases in a case where (m-n)≥2 will be collectively referred to as "switching elements of (m-n) phases" where appropriate.

In the aspect, the second threshold value may be equal to the first threshold value.

In the aspect, the second threshold value may be less than the first threshold value, the storage unit may be configured to store a third pattern which is a phase pattern in which on timings of the m switching elements are defined and which are not the first and second patterns, the selection unit may be configured to select the first pattern while the multi-phase converter is stopped when the predicted correlation value indicates that the time ratio is equal to or greater than the first threshold value, to select the second pattern while the multi-phase converter is stopped when the predicted correlation value indicates that the time ratio is less than the second threshold value, and to select the third pattern while the multi-phase converter is stopped when the predicted correlation value indicates that the time ratio is less than the first threshold value and equal to or greater than the second threshold value, an absolute valve of a difference between a maximum value of a phase difference between two switching elements which are defined to be sequentially turned on in the n-phase driving based on the third pattern and 360°/n may be greater than an absolute value of a difference between a maximum value of a phase difference between two switching elements which are defined to be sequentially turned on in the n-phase driving based on the second pattern and 360°/n and less than the absolute value of the difference between the maximum value of the phase difference between two switching elements which are defined to be sequentially turned on in the n-phase driving based on the first pattern and 360°/n, and the on off control unit may be configured to stop on/off control on the switching elements of (m-n) phases in the n-phase driving based on the third pattern. The switching elements may be classified into a plurality of combinations such that each of the combinations is composed of three switching elements that are defined to be sequentially turned on in the m-phase driving based on the third pattern. When (m-n)=1, the switching element of (m-n) phase on which the on/off control is stopped in the n-phase driving based on the third pattern may be the switching element which is turned on between the switching element which is firstly turned on and the switching element which is finally turned on out of the three switching elements in a combination having a phase difference that is smallest among the plurality of combinations, the phase difference being a phase difference between the switching element which is firstly turned on and the switching element which is finally turned on. When (m-n)≥2, the switching elements (m-n) phases on which the on/off control is stopped in the n-phase driving based on the third pattern may be :switching elements that are other than a combination of two switching elements which are defined to be sequentially turned on in the m-phase driving based on the third pattern, and that are each turned on between the switching element which is firstly turned on and the switching element which is finally turned on out of the three switching elements in a corresponding one of (m-n) combinations out of the plurality of combinations, the (m-n) combinations being selected in ascending order of the phase difference between the switching element which is firstly turned on and the switching element which is finally turned on.

In the aspect, out of the first, second, and third switching elements which are sequentially turned on in the m-phase driving based on at least one of the first and second patterns, a phase difference between the first switching element and the second switching element may be greater than 360°/m and less than 360°/n and a phase difference between the first switching element and the third switching element may be less than (360°/m)×3.

In the aspect, the control device for a multi-phase converter may further include a route acquiring unit configured to acquire scheduled travel route information on a scheduled travel route of a vehicle, which travels using a battery that supplies an input current to the multi-phase converter as a power source, and the prediction unit may be configured to predict a predicted current value which the battery is predicted to supply to the multi-phase converter as the predicted correlation value based an the scheduled travel route information.

In the aspect, the control device for a multi-phase converter may further include a history acquiring unit configured to acquire history information on a time in which control in the n-phase driving is performed and a time in which control in the m-phase driving is performed, and the prediction unit may be configured to predict the predicted correlation value based on the history information.

In the aspect, the control device for a multi-phase converter may further include a drive mode acquiring unit configured to acquire drive mode information on a drive mode of a vehicle which travels using a battery that supplies an input current to the multi-phase converter as a power source, and the prediction unit may be configured to predict the predicted correlation value based on the drive mode information.

According to another aspect of the disclosure, there is provided a multi-phase converter system including: the control device; and the multi-phase converter.

According to another aspect of the disclosure, there is provided a power supply system including: the multi-phase converter system; and a power supply configured to supply an input current to the multi-phase converter.

In the aspect, the power supply may be a fuel cell.

According to the disclosure, it is possible to provide a control device for a multi-phase converter, a multi-phase converter system, and a power supply system that can curb an increase in loss due to a ripple current with simple control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8A is a table for comparing in a magnitude of a ripple current between Patterns A and B;

FIG. 8B is a diagram illustrating phases and phase differences in Patterns A and B;

DETAILED DESCRIPTION OF EMBODIMENTS

Rough Configuration of Fuel Cell System

Figure 1:
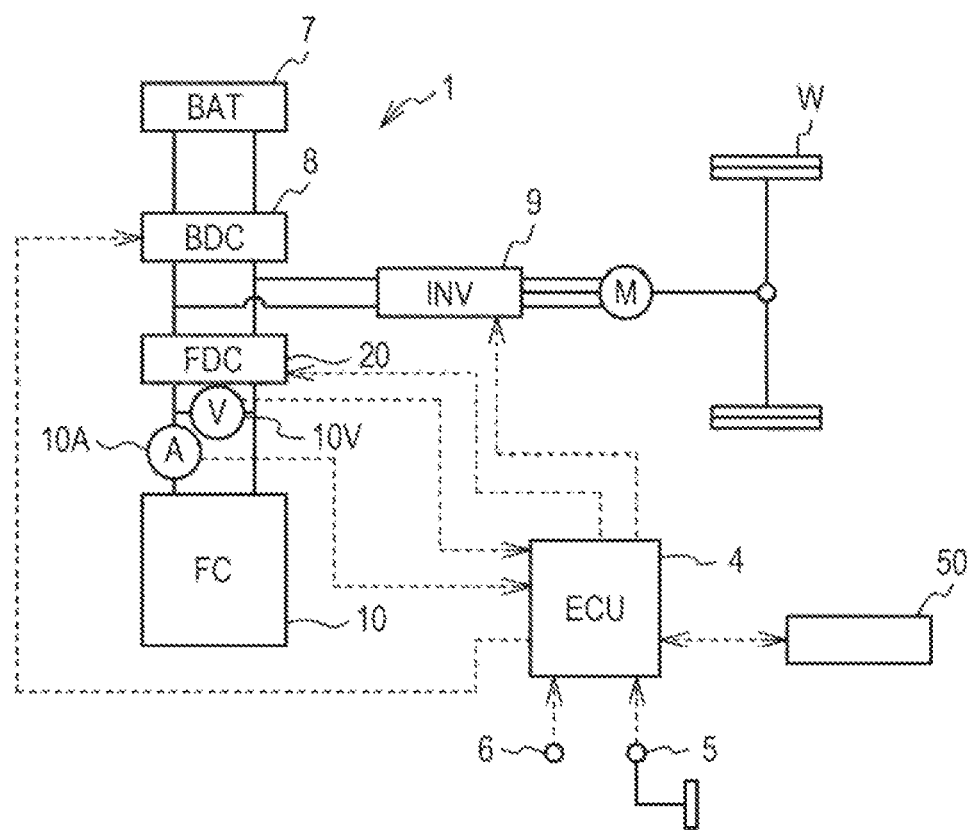
FIG. 1 is a diagram schematically illustrating a configuration of a fuel cell system which is mounted in a vehicle.

FIG. 1 is a diagram schematically illustrating a configuration of a fuel cell system 1 which is mounted in a vehicle. The fuel cell system 1 includes an electronic control unit (ECU) 4, a secondary battery (hereinafter referred to as a BAT) 7, a battery converter (hereinafter referred to as a BDC) 8, an inverter (hereinafter referred to as an INV) 9, a fuel cell stack (hereinafter referred to as an FC) 10, a step-up converter (hereinafter referred to as an FDC) 20, and a navigation device 50. Although not illustrated in FIG. 1, the fuel cell system 1 includes an oxidant gas supply system and a fuel gas supply system that supply an oxidant gas and a fuel gas to the FC 10. The vehicle includes a motor M for traveling, vehicle wheels W, an accelerator operation amount sensor 5, and an ignition switch 6.

The FC 10 is supplied with fuel gas and oxidant gas and generates electric power. In the FC 10, a plurality of unit cells of a solid polymer electrolyte type is stacked. A unit cell includes a membrane-electrode assembly which is a power generator member in which electrodes are disposed on both surfaces of an electrolyte membrane and a pair of separators between which the membrane-electrode assembly is interposed. The electrolyte membrane is a solid polymer membrane which is formed of a fluorine-based resin material or a hydrocarbon-based resin material having a sulfonate group and exhibits excellent proton conductivity in a wet state. The electrodes include carbon carriers and ionomers which are solid polymers having a sulfonate group and exhibits excellent proton conductivity in a wet state. The carbon carriers carry a catalyst (for example, a platinum or a platinum-cobalt alloy) for promoting a power generation reaction. A manifold for allowing reactant gases or a coolant to flow is provided in each unit cell. The reactant gases flowing in the manifold are supplied to a power generation region of each unit cell via gas flow passages which are provided in each unit cell.

The FDC 20 is a DC/DC converter that steps up a direct-current voltage winch is output from the FC 10 at a predetermined step-up ratio and supplies electric power output from the FC 10 to the INV 9, and is an example of a power converter. The INV 9 converts input direct-current power to three-phase alternating-current power and supplies the three-phase alternating-current power to the motor M. The motor M drives the vehicle wheels W to cause the vehicle to travel. The BDC 8 is a bidirectional DC/DC converter. That is, the BDC 8 steps down a direct-current voltage which is adjusted by the FDC 20 or steps up a direct-current voltage of the BAT 7 and supplies output electric power of the BAT 7 to the INV 9. The BDC 8 does not have to be provided. In this case, the INV 9 serves as a power converter. The BAT 7 can store electric power of the FC 10.

The ECU 4 includes a central processing unit (CPU), a read only memory (ROM), and a random access memory (RAM). The ECU 4 is electrically connected to the accelerator operation amount sensor 5, the ignition switch 6, a current sensor 10A, a voltage sensor 10V, the FDC 20, the BDC 8, and the navigation device 50. Map data, a past travel history of the vehicle 1, and the like are stored in a storage device of the navigation device 50. The navigation device 50 has a Global Positioning System (GPS) receiver, which acquires position information of the vehicle, incorporated therein. The ECU 4 controls output electric power of the FC 10 based on a detected value of the accelerator operation amount sensor 5 or the like. The ECU 4 acquires an output current value of the FC 10 measured by the current sensor 10A and an output voltage value of the FC 10 measured by the voltage sensor 10V. The ECU 4 is an example of a control device that controls the FDC 20 and includes a driven phase number control unit, a storage unit, a selection unit, an on-off control unit, and a prediction unit of which details will be described later and which are functionally realized by the CPU, the ROM, and the RAM of the ECU 4. The ECU 4 and the FDC 20 constitute an example of a multi-phase converter system, and the ECU 4, the FDC 20, and the FC 10 constitute an example of a power supply system.

Circuit Configuration of FDC

Figure 2:
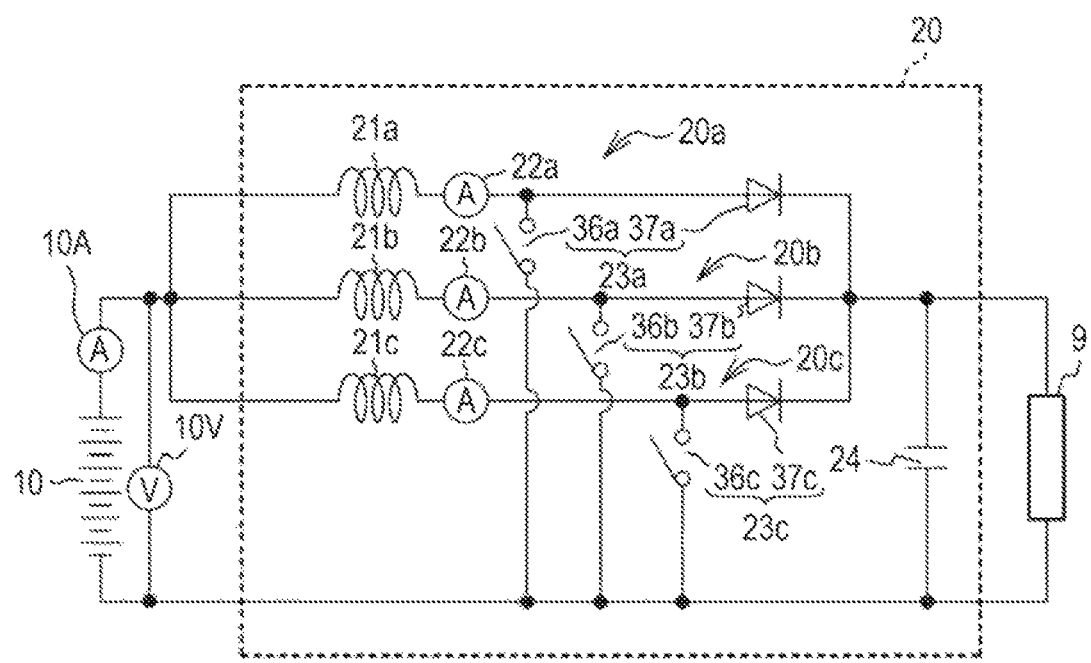
FIG. 2 is a diagram illustrating a circuit configuration of a step-up converter.

FIG. 2 is a diagram illustrating a circuit configuration of the FDC 20. In FIG. 2, the FC 10 and the INV 9 are also illustrated. The FDC 20 is a multi-phase converter of m phases, where m is 3 in this embodiment. Accordingly, the FDC 20 includes three converter circuits 20a to 20c and a capacitor 24. Here, m is an integer equal to or greater than 3. The converter circuit 20a includes a reactor 21a, a current sensor 22a, and an intelligent power module (IPM) 23a. The converter circuit 20b includes a reactor 21b, a current sensor 22b, and an IPM 23b. The converter circuit 20c includes a reactor 21c, a current sensor 22c, and an IPM 23c. The IPM 23a includes a switching element 36a and a diode 37a. The IPM 23b includes a switching element 36b and a diode 37b. The IPM 23c includes a switching element 36c and a diode 37c. The switching elements 36a to 36c are referred to as SWs 36a to 36c in this specification.

The reactor 21a, the current sensor 22a, and the diode 37a are connected in series. Similarly, the reactor 21b, the current sensor 22b, and the diode 37b are connected in series. The reactor 21c, the current sensor 22c, and the diode 37c are also connected in series. These components which are connected in series are connected in parallel between a positive electrode side of the FC 10 and a positive electrode side INV 9. Accordingly, it is possible to curb emission of heat by decreasing current values flowing in the reactors 21a to 21c and the IPMs 23a to 23c. The SW 36a is connected between a portion between the reactor 21a and the diode 37a and a negative electrode side of the FC 10. Similarly, the SW 36b is connected between a portion between the reactor 21b and the diode 37b and a negative electrode side of the FC 10. The SW 36c is connected between a portion between the reactor 21c and the diode 37c and a negative electrode side of the FC 10. The reactors 21a to 21c are, for example, identical components having the same configuration and the same capacity, but are not limited thereto. The current sensors 22a to 22c are connected to the reactors 21a to 21c downstream therefrom, but are not limited thereto and may be connected upstream therefrom. The FC 10 and the reactors 21a to 21c are electrically connected to each other via a conductive member such as a bus bar or a cable.

The ECU 4 switches the SWs 36a to 36c on and off, for example, in the same constant period. By switching the SWs 36a to 36c between on and off, currents flowing in the SWs 36a to 36c are controlled. On and off of the SW s 36a to 36c are controlled based on duty ratios of pulse signals which are supplied to the SWs 36a to 36c. A duty ratio is a ratio of an on-state time to one on/off period. The ECU 4 determines the duty ratio based on current values detected by the current sensors 22a to 22c or a target step-up ratio.

When the SW 36a is turned on, a current starts flowing from the FC 10 to the SW 36a via the reactor 21a, and magnetic energy based on direct-current excitation is accumulated in the reactor 21a. When the SW 36a is turned off, the magnetic energy accumulated in the reactor 21a in the on period is output as a current to the INV 9 via the diode 37a. Accordingly, by controlling the duty ratios of the SWs 36a to 36c, it is possible to control energy (a time average) accumulated in the reactors 21a to 21c and to control currents (effective currents) flowing in the reactors 21a to 21c on average.

An induced voltage which is generated by the magnetic energy accumulated in the reactor 21a when the SW 36a is turned off is superimposed on an output voltage of the FC 10, and a voltage higher than the output voltage of the FC 10 is applied to the INV 9. The same is true of the SWs 36b and 36c and the reactors 21b and 21c. The ECU 4 transmits a control signal such that the SWs 36a to 36c are sequentially turned on, and the induced voltages are sequentially superimposed on the output voltage of the FC 10. Accordingly, the voltage which is input to the INV 9 is kept higher than the output voltage of the FC 10. The capacitor 24 is connected between a portion between the diodes 37a to 37c and the positive electrode side of the INV 9 and the negative electrode side of the INV 9 and serves to decrease voltage fluctuation.

The ECU 4 selects Pattern A or Pattern B as a phase pattern in which the phases of the SWs 36a to 36c of the converter circuits 20a to 20c are defined. The phases of the SWs 36a to 36c in Pattern A are 0°, 120°, and 240°, respectively. The phases of the SWs 36a to 36c in Pattern B are 0°, 180°, and 270°, respectively. These phases define on timings of the switching elements. Patterns A and B are stored in advance in the ROM of the ECU 4. The ROM of the ECU 4 is an example of a storage unit. Details of Patterns A and B will be described later.

Here, the ECU 4 controls on/off of the SWs 36a to 36c substantially in the same period and substantially at the same duty ratio. Here, substantially the same period does not mean only a case in which the periods of the SWs 36a to 36c completely match each other, and the periods may deviate from each other to the extent that phase differences between the SWs 36a to 36c in which on and off are repeated barely change in a predetermined period. For example, this is because, when transmission speeds of drive signals to the SWs 36a to 36c are uneven, the periods may not completely match each other. In addition, substantially the same duty ratio does not mean only a case in which the duty ratios of the SWs 36a to 36c completely match each other. For example, when the average values in one period of reactor currents flowing in the reactors 21a to 21c can be considered to be substantially the same, the duty ratios may not completely match each other. For example, this is because, when there is unevenness in a resistance value of the bus bars connecting the reactors 21a to 21c to the FC 10 or the like and the duty ratios are made to completely match each other, there is a likelihood that the average values of the reactor currents will be different to such an extent that they cannot be considered to be substantially the same.

The ECU 4 performs a process of acquiring an input current value of the EDO 20 measured by the current sensor 10A and increasing the number of driven phases of the converter circuits 20a to 20c as the input current value of the PDC 20 increases. Specifically, one-phase driving in which on and off of only one of the SWs 36a to 36c are controlled, two-phase driving in which on and off of two of the SWs 36a to 36c are controlled, and three-phase driving in which on and off of all the SWs 36a to 36c are controlled are switched. This process is an example of processes which are performed by a driven phase number control unit and an on/off control unit.

The ECU 4 may increase the number of driven phases of the converter circuits 20a to 20c as an input power value of the FDC 20 increases or as an input voltage value of the FDC 20 decreases. The ECU 4 may increase the number of driven phases of the converter circuits 20a to 20c as a target output current value of the FDC 20 increases, as a target output power value of the FDC 20 increases, or as a target output voltage value of the FDC 20 increases. This is because any case corresponds to a case in which electric power generated by the FC 10 increases and the input current value of the FDC 20 increases.

Patterns A and B (m=3, n=2)

A case in which three (m=3) converter circuits 20a to 20c are driven (hereinafter referred to as three-phase driving), a case in which two (n=2) converter circuits 20a and 20b are driven (hereinafter referred to as two-phase driving), a case in which one converter circuit 20a is driven (hereinafter referred to as one-phase driving) in Patterns A and B will be described below. As described above, m is an integer equal to or greater than 3, and n is an integer less than m and equal to or greater than 2 and is an integer other than divisors of m.

Pattern A (m=3, n=2)

Figure 3A:
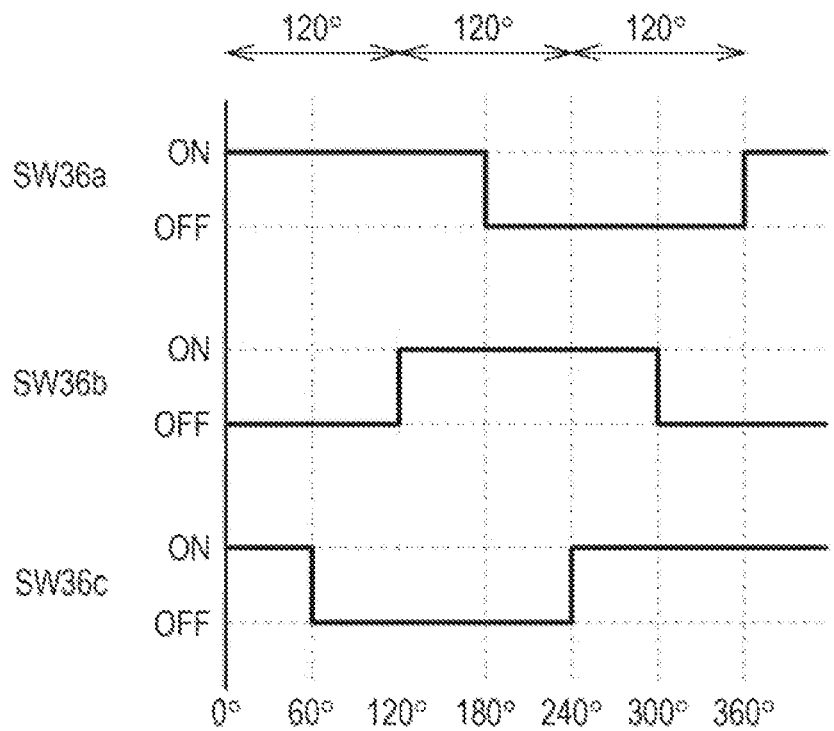
FIG. 3A is a graph illustrating operations of switching elements in three-phase driving based on Pattern A.
Figure 3B:
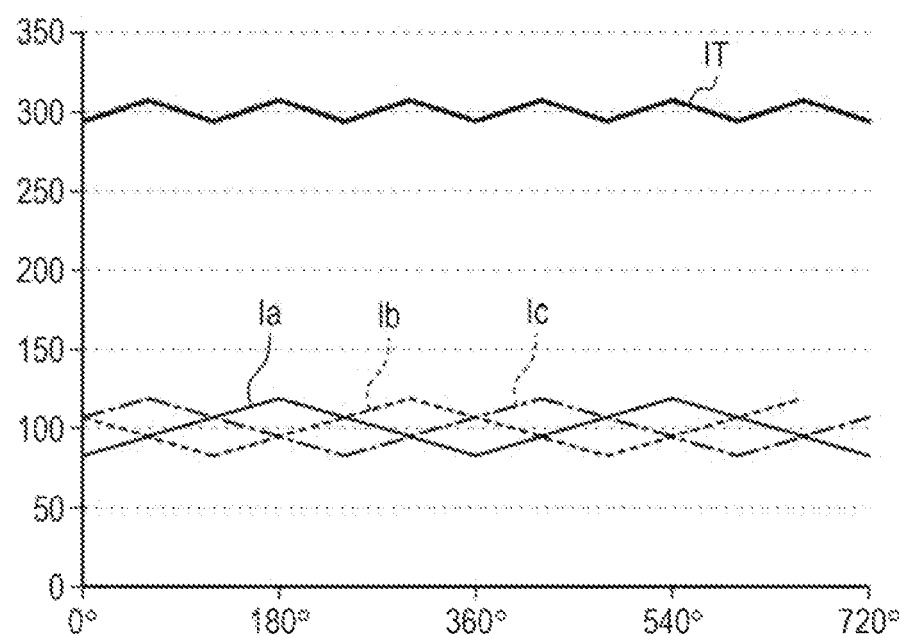
FIG. 3B is a graph illustrating reactor currents and an output current of the step-up converter in three-phase driving based on Pattern A.

Pattern A will be first described below. FIG. 3A is a graph illustrating operations of the SWs 36a to 36c in three-phase driving based on Pattern A. FIG. 3B is a graph illustrating reactor currents Ia to Ic and an output current IT of the FDC 20 in three-phase driving based on Pattern A. In FIGS. 3A and 3B, the horizontal axis represents a phase. The vertical axis in FIG. 3A represents on/off states of the switching elements. The vertical axis in FIG. 3B represents a current. In this embodiment, it is assumed that the duty ratios of the SWs 36a to 36c are 0.5. The reactor currents Ia to Ic are currents flowing in the reactors 21a to 21c. The output current IT of the FDC 20 is a combined current of the reactor currents Ia to Ic.

Figure 4A:
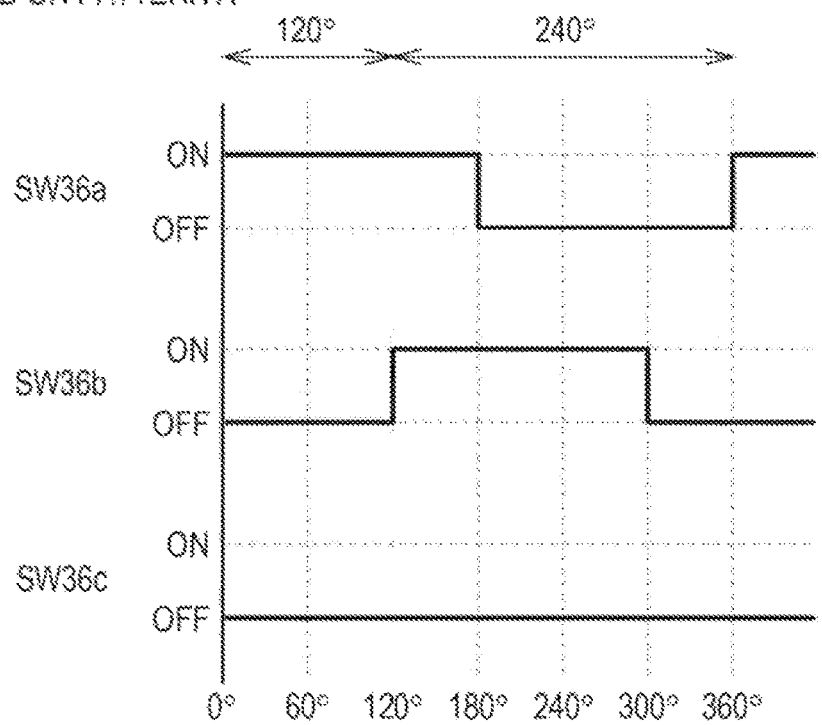
FIG. 4A is a graph illustrating operations of switching elements in two-phase driving based on Pattern A.
Figure 4B:
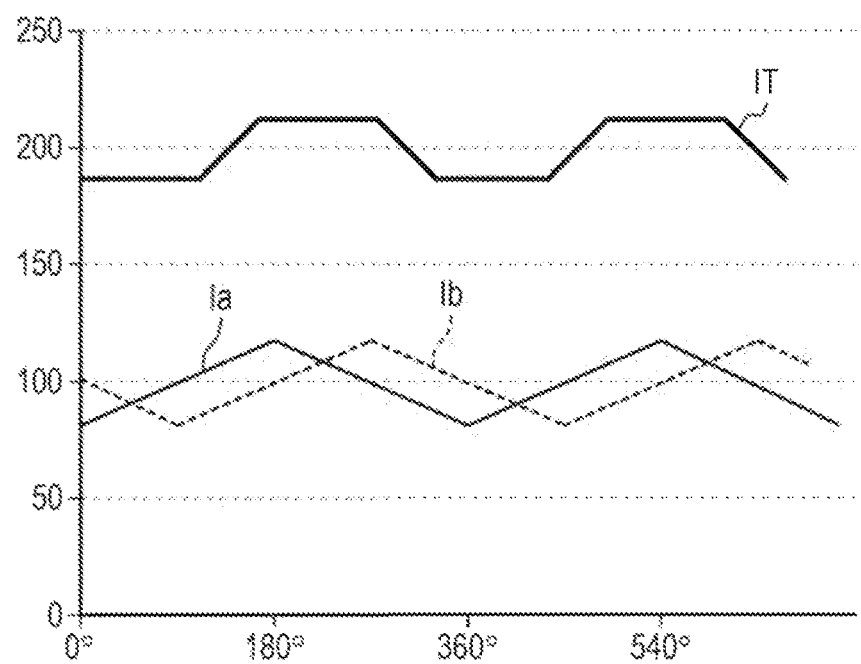
FIG. 4B is a graph illustrating reactor currents and an output current of the step-up converter in two-phase driving based on Pattern A.

FIG. 4A is a graph illustrating operations of the SWs 36a to 36c in two-phase driving based on Pattern A. FIG. 4B is a graph illustrating reactor currents Ia and Ib and an output current IT of the FDC 20 in two-phase driving based on Pattern A. In two-phase driving, on and off of the SWs 36a and 36b are controlled and on/off control of the SW 36c is stopped. Accordingly, the reactor current Ic does not flow.

Figure 5A:
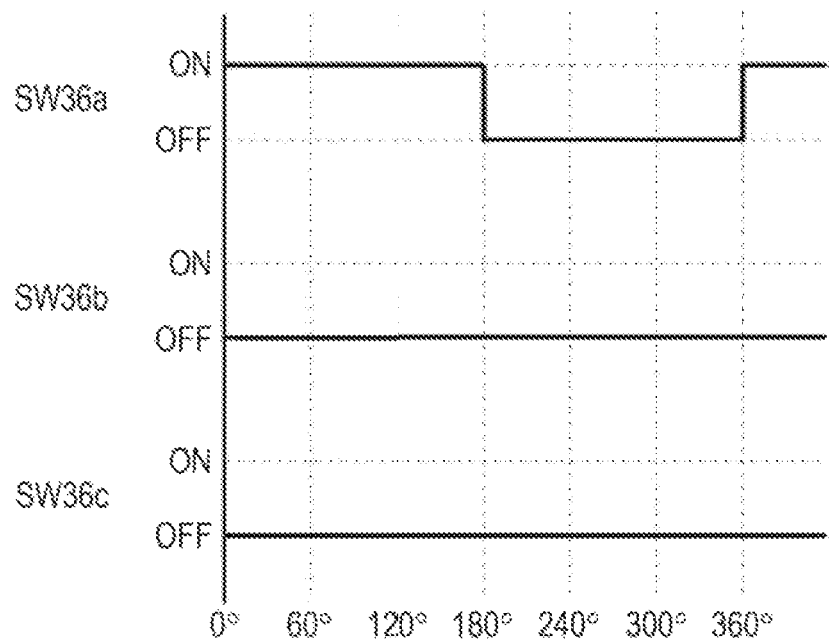
FIG. 5A is a graph illustrating operations of switching elements in one-phase driving based on Pattern A.
Figure 5B:
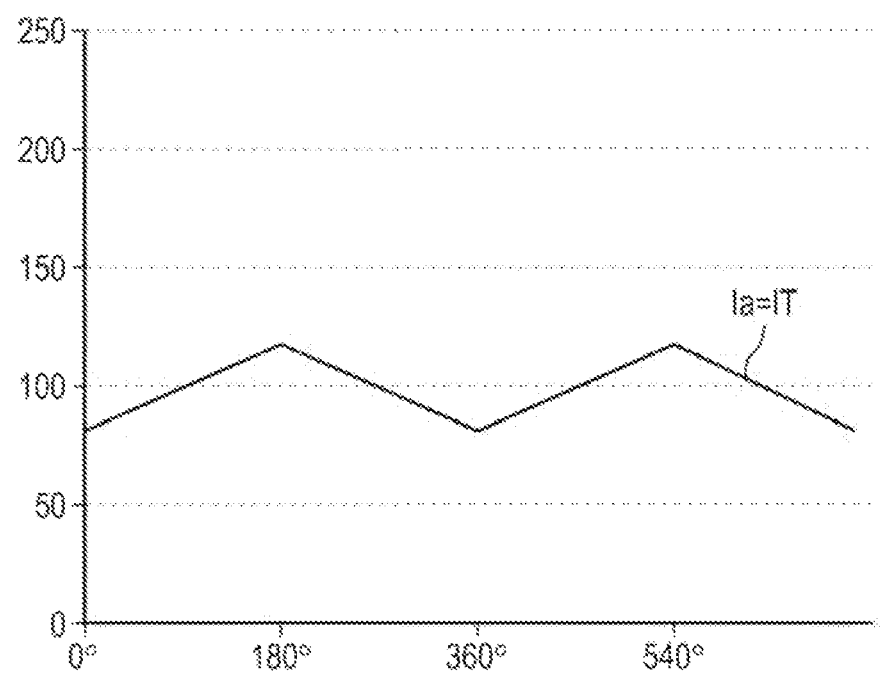
FIG. 5B is a graph illustrating reactor currents in one-phase driving based on Pattern A.

FIG. 5A is a graph illustrating operations of the SWs 36a to 36c in one-phase driving based on Pattern A. FIG. 5B is a graph illustrating reactor current Ia in one-phase driving based on Pattern A. In one-phase driving, on and off of only the SW 36a are controlled and on/off control of the SWs 36b and 36c is stopped. Accordingly, the reactor currents Ib and Ic do not flow. In one-phase driving, the reactor current Ia serves as the output current IT of the FDC 20.

In Pattern A, a ripple current of the output current IT when the duty ratio is 0.5 is greater in one-phase driving than that in two-phase driving and three-phase driving and is less in three-phase driving than that in one-phase driving and two-phase driving, when it is assumed that the currents flowing in the phases are the same. Here, when the magnitude of the ripple current of the output current IT in one-phase driving in which the magnitude of the ripple current of the output current IT is a maximum is defined as being 1, the magnitude of the ripple current of the output current IT in two-phase driving based on Pattern A is ⅔ and the magnitude of the ripple current in three-phase driving based on Pattern A is ⅓. The ripple current of the output current IT indicates a difference between the maximum value and the minimum value of the output current IT. When a ripple current is simply mentioned in the following description, it refers to the ripple current of the output current IT instead of the reactor currents Ia to Ic.

Pattern B (m=3, n=2)

Figure 6A:
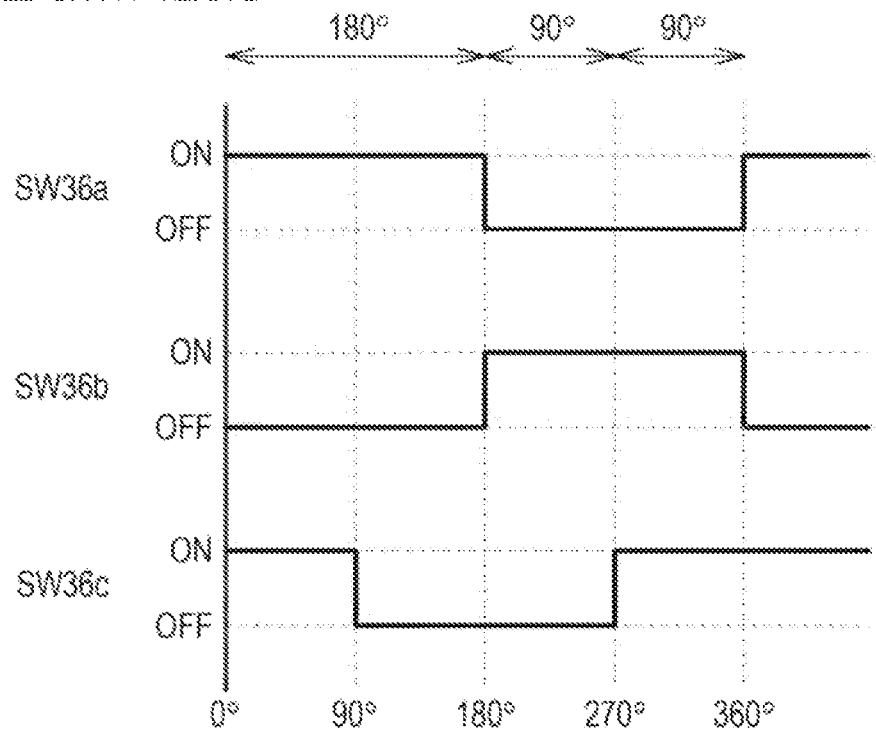
FIG. 6A is a graph illustrating operations of switching elements in three-phase driving based on Pattern B.
Figure 6B:
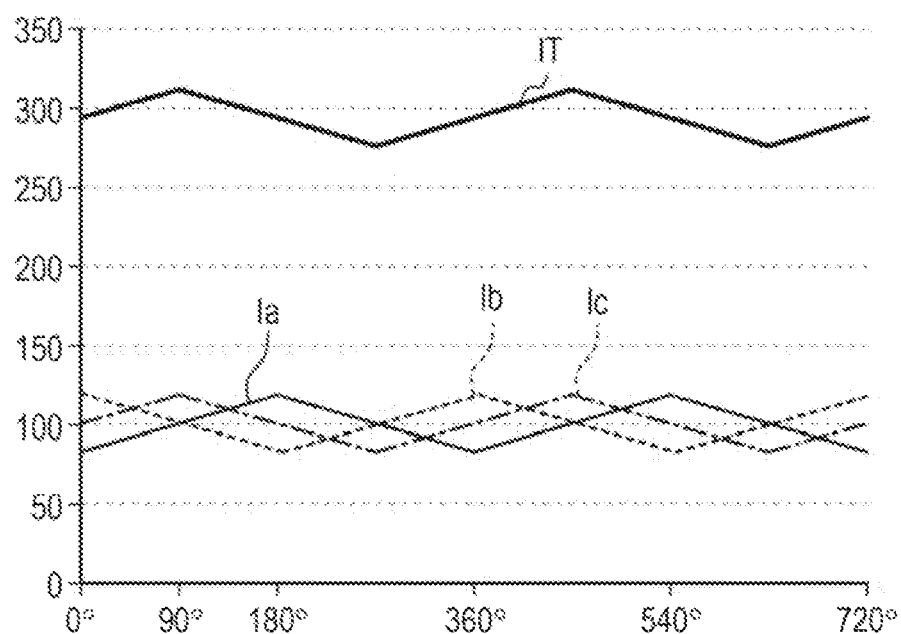
FIG. 6B is a graph illustrating reactor currents and an output current of the step-up converter in three-phase driving based on Pattern B.
Figure 7A:
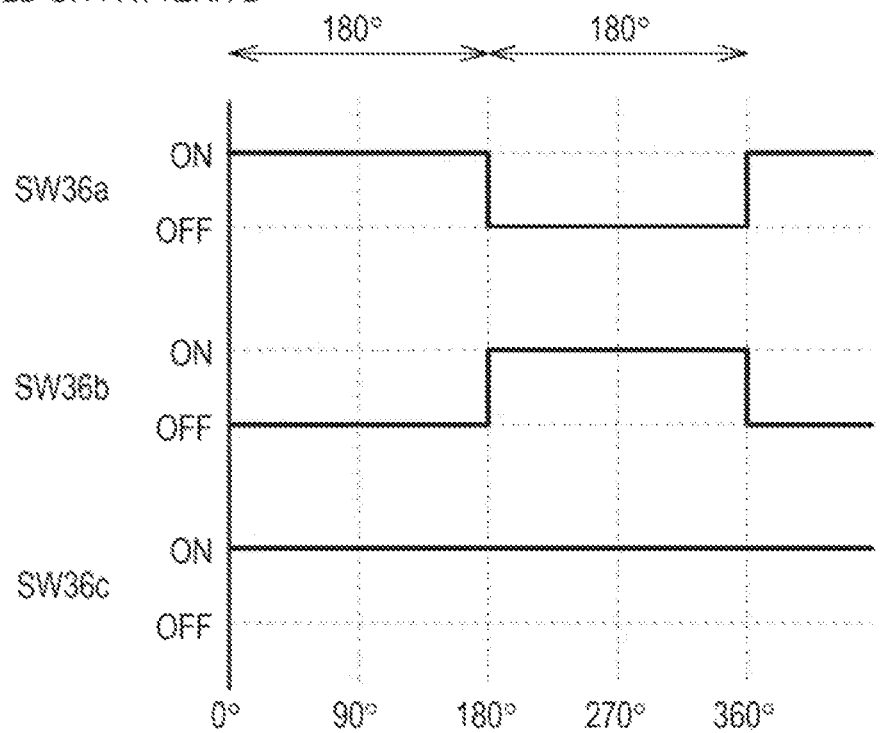
FIG. 7A is a graph illustrating operations of switching elements in two-phase driving based on Pattern B.
Figure 7B:
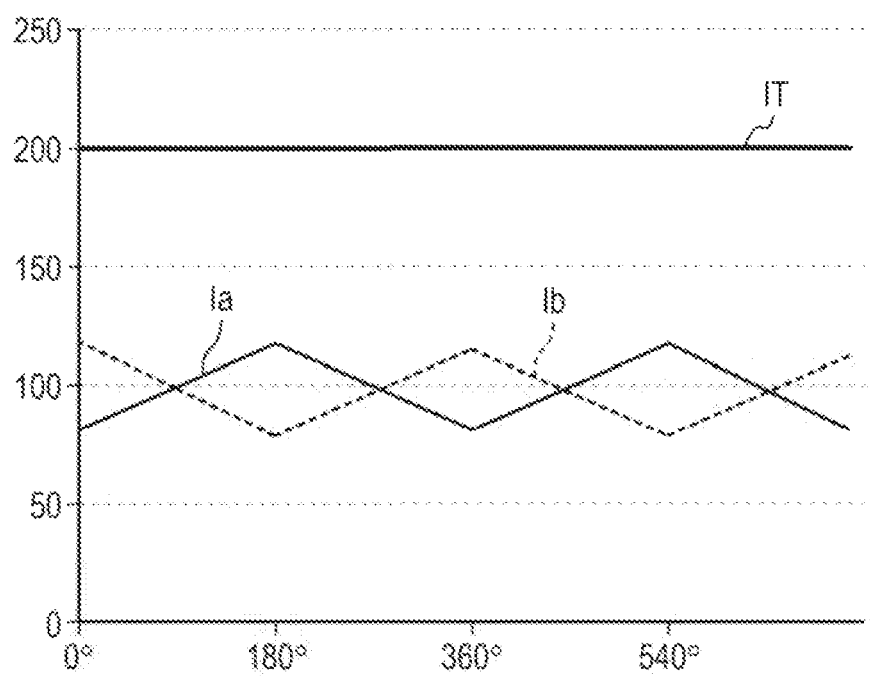
FIG. 7B is a graph illustrating reactor currents and an output current of the step-up converter in two-phase driving based on Pattern B.

Pattern B will be described below. FIG. 6A is a graph illustrating operations of the SWs 36a to 36c in three-phase driving based on Pattern B. FIG. 6B is a graph illustrating reactor currents Ia to Ic and an output current IT of the FDC 20 in three-phase driving based on Pattern B. The reactor currents Ia to Ic are currents flowing in the reactors 21a to 21c. FIG. 7A is a graph illustrating operations of the SWs 36a to 36c in two-phase driving based on Pattern B. FIG. 7B is a graph illustrating reactor currents Ia and Ib and an output current IT of the FDC 20 in two-phase driving based on Pattern B. The operations of the SWs 36a to 36c and the reactor currents Ia to Ic in one-phase driving based on Pattern B are the same as in one-phase driving based on Pattern A.

When it is assumed that the currents flowing in the phases are the same and the magnitude of the ripple current in one-phase driving is defined as being I as described above, the magnitude of the ripple current in two-phase driving based on Pattern B is 0 and the magnitude of the ripple current in three-phase driving based on Pattern B is 1.

Comparison Between Patterns A and B

FIG. 8A is a table for comparison of the magnitude of the ripple current between Patterns A and B. The ripple current in three-phase driving is less in Pattern A than in Pattern B. On the other hand, the ripple current in two-phase current is less in Pattern B than in Pattern A. When the ripple current is less, the loss can be further decreased. Accordingly, Pattern A is suitable for three-phase driving and Pattern B is suitable for two-phase driving.

FIG. 8B is a diagram illustrating phases and phase differences in Patterns A and B. The phase differences in Pattern A are defined as follows. A phase difference $D_{A(a-b)}$ between the SW 36a and the SW 36b, a phase difference $D_{A(b-c)}$ between the SW 36b and the SW 36c, and a phase difference $D_{A(c-a)}$ between the SW 36c and the SW 36a are 120°. In Pattern B, a phase difference $D_{(a-b)}$ between the SW 36a and the SW 36b is 180°, a phase difference $D_{B(b-c)}$ between the SW 36b and the SW 36c is 90°, and a phase difference $D_{B(c-a)}$ between the SW 36c and the SW 36a is 90°.

Which of Patterns A and B is a pattern suitable for two-phase driving can be identified as follows. The maximum value of the phase differences $D_{A(a-b)}$, $D_{A(b-c)}$, and $D_{A(c-a)}$ in Pattern A is 120°. The maximum value of the phase differences $D_{B(a-b)}$, $D_{B(b-c)}$, and $D_{B(c-a)}$ in Pattern B is $D_{B(a-b)}$=180°. The absolute value of a difference between the maximum value in Pattern A and 180° is 60°. The absolute value of a difference between the maximum value in Pattern B and 180° is 0°. Here, 180° is a value which is calculated by 360°/n=360°/2, and is a phase difference at which the ripple current of the output current IT is the minimum in two-phase driving. The absolute value is less in Pattern B than in Pattern A. The pattern with the less absolute value in this way is suitable for two-phase driving. Accordingly, Pattern B is more suitable for two-phase driving than Pattern A. In other words, Pattern A is more suitable for three-phase driving than Pattern B.

A switching element of which on/off control is to be stopped at the time of two-phase driving based on Pattern B can be identified as follows. As illustrated in FIG. 8B, a phase difference between a phase of a switching element which is to be firstly turned on and a phase of a switching element which is to be finally turned on out of three arbitrary switching elements which are defined to be sequentially turned on at the time of three-phase driving based on Pattern B is defined as follows. The phase difference $D_{B(a-c)}$ between the SW 36a and the SW 36c is 270°. The phase difference $D_{B(b-a)}$ between the SW 36b and the SW 36a is 180°. The phase difference $D_{B(c-b)}$ between the SW 36c and the SW 36b is 270°. The phase difference $D_{B(b-a)}$ out of the three phase differences has a minimum value. A switching element of which on/off control is to be stopped is the SW 36c which is turned on between the on timing of the SW 36b and the on timing of the SW 36a which define the minimum phase difference at the time of three-phase driving. The phase difference when on/off control of the SW 36c is stopped at the time of two-phase driving is $D_{B(a-b)}=D_{B(b-a)}=180°$ which matches 360°/2=180°.

For example, the phase differences when on/off control of the SW 36a is stopped at the time of two-phase driving are $D_{B(b-c)}=90°$ and $D_{B(c-b)}=270°$ and a difference between the phase differences and 180° is greater than that when the SW 36c is stopped. Similarly, the phase differences when on/off control of the SW 36b is stopped at the time of two-phase driving are $D_{B(a-c)}=270°$ and $D_{B(c-a)}=90°$ and a difference between the phase differences and 180° is greater than that when the SW 36c is stopped. Accordingly, by stopping on/off control of the SW 36c out of the SWs 36a to 36c, it is possible to curb the ripple current in two-phase driving based on Pattern B.

Since the on/off control of the SW 36c is stopped at the time of two-phase driving based on Pattern A and $D_{A(a-b)}=D_{A(b-c)}=D_{A(c-a)}=120°$, on/off control of one of the SWs 36a to 36c has only to be stopped without being limited thereto, on/off control of two of the SWs 36a to 36c has only to be stopped in any of Patterns A and B at the time of one-phase driving.

Pattern Selection Control

Figure 9:
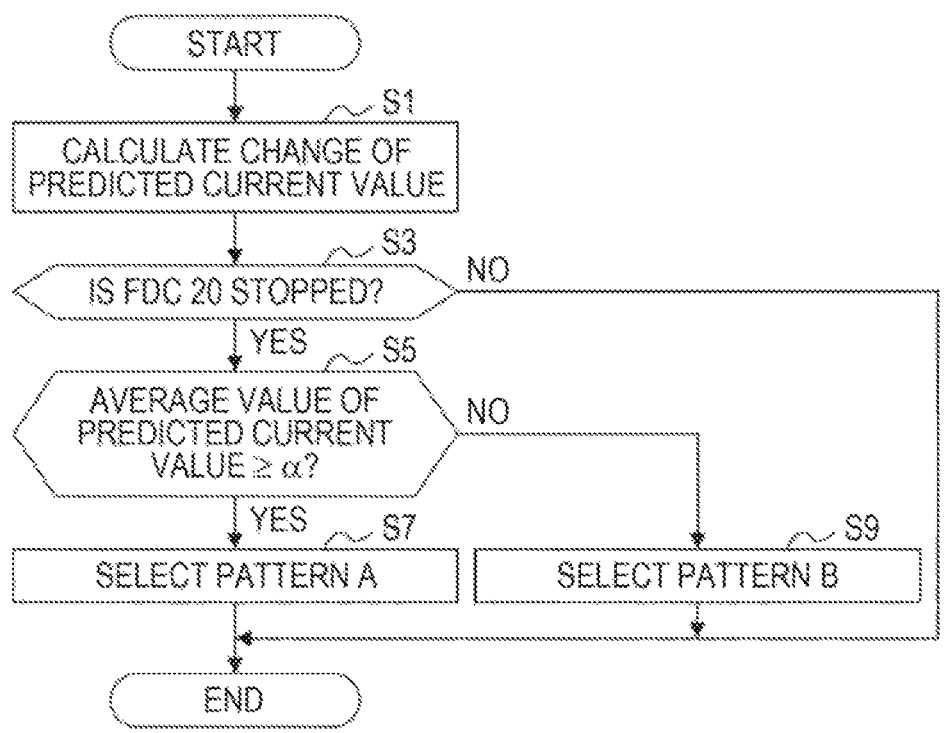
FIG. 9 is a flowchart illustrating an example of pattern selection control.

FIG. 9 is a flowchart illustrating an example of pattern selection control. The pattern selection control is repeatedly performed at intervals of a predetermined time. The ECU 4 calculates change of a predicted current value which is a current value which is predicted to be output from the FC 10 (Step S1). The process of Step S1 is an example of a process which is performed by a prediction unit.

The change of the predicted current value is calculated as follows. The ECU 4 performs a process of acquiring scheduled travel route information on a scheduled travel route from a current location of the vehicle to a destination. The scheduled travel route is a route for which guidance from the current location of the vehicle to a destination set in the navigation device 50 by a user is performed by the navigation device 50 or a route which is predicted from the past travel history stored in the navigation device 50 when a destination is not set. The ECU 4 acquires road information (such as an express way, an uphill road, a downhill road, a traffic jam, and signals) of a scheduled travel route which can be acquired from the navigation device 50 as the scheduled travel route information. This process is an example of a process which is performed by a route acquiring unit that acquires scheduled travel route information and that is functionally realized by the CPU, the ROM, and the RAM of the ECU 4. The ECU 4 predicts a travel speed of the vehicle at each point on the scheduled travel route based on such information. The ECU 4 calculates a predicted output of the motor M at each time in consideration of the predicted travel speed and a road gradient. The ECU 4 calculates a predicted output of an auxiliary machine of the fuel cell system 1 along therewith. The ECU 4 calculates a predicted output of an air conditioner from information of an outside air temperature or a set temperature of the air conditioner. The ECU 4 calculates a predicted required output of all external loads at each time by summing the predicted outputs. Then, the ECU 4 calculates a predicted required output for the FC 10 in consideration of a state of charge of the BAT 7 and calculates a predicted current value of the FC 10 at each tune with reference to current-power characteristics of the FC 10 which is stored in the ECU 4. Here, since the FC 10 is connected to the FDC 20, the output current of the FC 10 matches the input current of the FDC 20.

Then, the ECU 4 determines whether the FDC 20 is stopped (Step S3). For example, when the vehicle stops temporarily and becomes an intermittent operating state in which fuel gas is continuously supplied to the FC 10 but generation of electric power is stopped, on/off control of all the SWs 36a to 36c is stopped and the FDC 20 stops. When the determination result of Step S3 is NO, that is, when on/off control of at least one of the SWs 36a to 36c is performed, this control routine ends.

When the determination result of Step S3 is YES, the ECU 4 determines whether an average value of predicted current values is equal to or greater than a threshold value α (Step S5). The average value of the predicted current values can be calculated, for example, by integrating the predicted current value at each time from the current location to a destination and dividing the resultant value by the time from a current time point to a time point at which the vehicle arrives at the destination. The threshold value α is set to, for example, an input current value of the FDC 20 when two-phase driving is switched to three-phase driving, that is, an output current value of the FC 10 when two-phase driving is switched to three-phase driving. When the determination result of Step S5 is YES, the time in which the FDC 20 is controlled in three-phase driving can be predicted to be longer than the time in which it is driven in two-phase driving in a predetermined period of time in which the vehicle moves from the current location to the destination. Accordingly, in this case, the ECU 4 selects Pattern A which is suitable for three-phase driving as the phase pattern (Step S7). When the determination result of Step S5 is NO, the time in which the FDC 20 is driven in two-phase driving can be predicted to be longer than the time in which it is driven in three-phase driving and the ECU 4 selects Pattern B as the phase pattern (Step S9). The processes of Steps S7 and S9 are an example of a process which is performed by a selection unit.

Figure 10A:
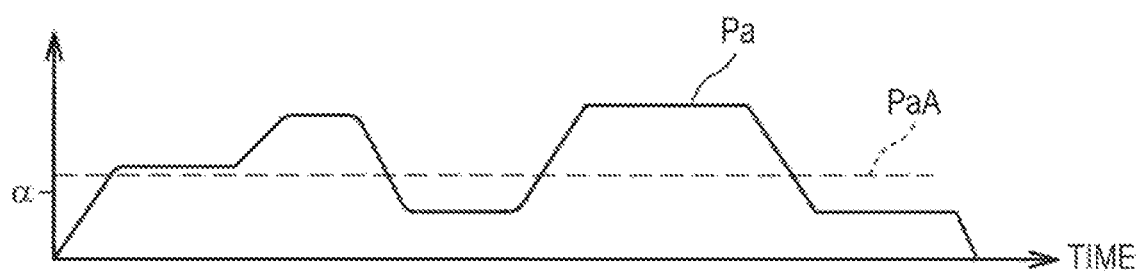
FIG. 10A is an example of a graph illustrating change of a calculated predicted current value.
Figure 10B:
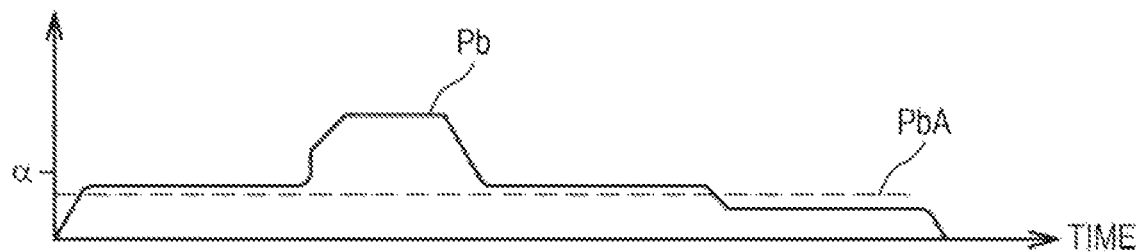
FIG. 10B is another example of a graph illustrating change of a calculated predicted current value.

FIGS. 10A and 10B are an example of a graph illustrating change of the calculated predicted current value. FIG. 10A illustrates a case in which the average value PaA of the calculated predicted current values Pa is relatively great, and FIG. 10B illustrates a case in which the average value PbA of the calculated predicted current values Pb is relatively small. The predicted current values Pa and Pb are calculated based on the same time and different scheduled travel routes from a current location to a destination. When the average value PaA is equal to or greater than a threshold value α as illustrated in FIG. 10A, Pattern A is selected. When the average value PbA is less than the threshold value α as illustrated in FIG. 10B, Pattern B is selected.

Figure 11:
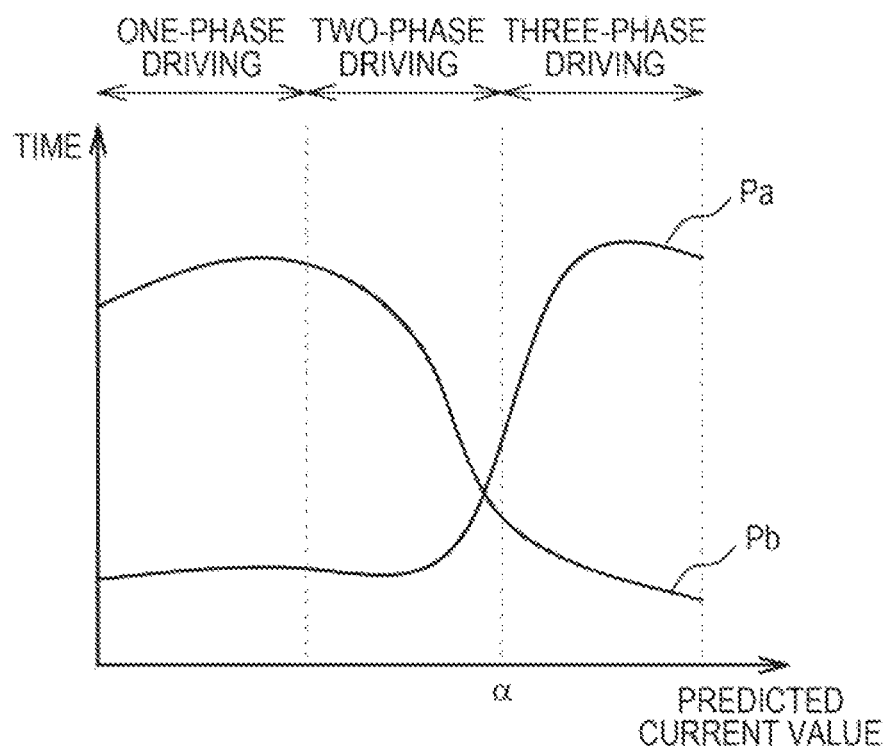
FIG. 11 is a graph illustrating a relationship between the predicted current values illustrated in FIGS. 10A and 10B and a time in which control is performed based on the predicted current values.

FIG. 11 is a graph illustrating a relationship between the predicted current values illustrated in FIGS. 10A and 10B and the times in which control is performed based on the predicted current values. The horizontal axis represents the predicted current value and the vertical axis represents the time. In FIG. 11, the ranges of the predicted current values in which control is performed in one-phase driving, two-phase driving, and three-phase driving are illustrated. The predicted current value Pa is greater in the time ratio in which control is performed in three-phase driving than in the time ratio in which control is performed in two-phase driving or in the time ratio in which control is performed in one-phase driving. The predicted current value Pb is greater in the time ratio in which control is performed in one-phase driving than in the time ratio in which control is performed in two-phase driving or in the time ratio in which control is performed in three-phase driving and is greater in the time ratio in which control is performed in two-phase driving than in the time ratio in which control is performed in three-phase driving. At a ratio of a drive time of three-phase driving to a drive time of two-phase driving, the predicted current value Pa is greater than the predicted current value Pb. In general, when the average value of the predicted current values is greater, the time ratio in which control is performed in three-phase driving is greater than when the average value is less. Accordingly, the average value PaA of the predicted current values Pa or the average value PbA of the predicted current values Pb illustrated in FIGS. 10A and 10B can be said to be an example of a predicted correlation value which is correlated with the time ratio which is a ratio of the time in which control is predicted to be performed in three-phase driving to the time in which control is predicted to be performed in two-phase driving in a predetermined period of time.

In this way, when the average value of the predicted current values is equal to or greater than the threshold value α, the time in which control is performed in three-phase driving is predicted to be relatively long and Pattern A which is suitable for three-phase driving is selected as the phase pattern while the FDC 20 is stopped. When the average value of the predicted current values is less than the threshold value α, the time in which control is performed in one-phase driving or two-phase driving is predicted to be relatively long and Pattern B which is suitable for two-phase driving is selected as the phase pattern while the FDC 20 is stopped. In this way, since the phase pattern is selected while the FDC 20 is stopped, control can be performed more simply than when the phase pattern is switched while the FDC 20 is being driven. Since an optimal pattern is selected depending on the average value of the predicted current values, it is possible to decrease the ripple current and to curb an increase in loss due to the ripple current.

In Step S1, the ECU 4 acquires road information of a scheduled travel route from the navigation device 50, but it not limited thereto and may acquire the road information of the scheduled travel route, for example, from an external server in which the road information of the scheduled travel route is stored via a radio communication network.

In Step S1, the ECU 4 calculates change of the predicted current value from a current location to a destination which is set in the navigation device 50, but is not limited thereto and may calculate change of the predicted current value from the current location of the vehicle to a point at which the vehicle stops temporarily in the next time and the FDC 20 is predicted to stop. In this case, when the FDC 20 stops, the ECU 4 may calculate change of the predicted current value from that position to a destination or a point at which the FDC 20 is predicted to stop again. Accordingly, since change of the predicted current value is calculated for each short route, the FDC 20 can be made to be driven in a phase pattern suitable for that route and it is possible to curb a loss due to an increase in ripple current in the FDC 20.

A total time in which the predicted current value is less than a predetermined value and a total time in which the predicted current value is equal to or greater than the predetermined value in a predetermined period of time may be predicted. In this case, Pattern A may be selected when the time ratio of the latter total time to the former total time is equal to or greater than a threshold value, and Pattern B may be selected when the time ratio is less than the threshold value. In this case, the time ratio itself is an example of the predicted correlation value.

Pattern A is an example of a first pattern which is selected when the time ratio at which control is performed in m-phase driving is relatively great, and Pattern B is an example of a second pattern which is selected when the time ratio at which control is performed in m-phase driving is relatively small.

FIRST MODIFIED EXAMPLE

Figure 12:
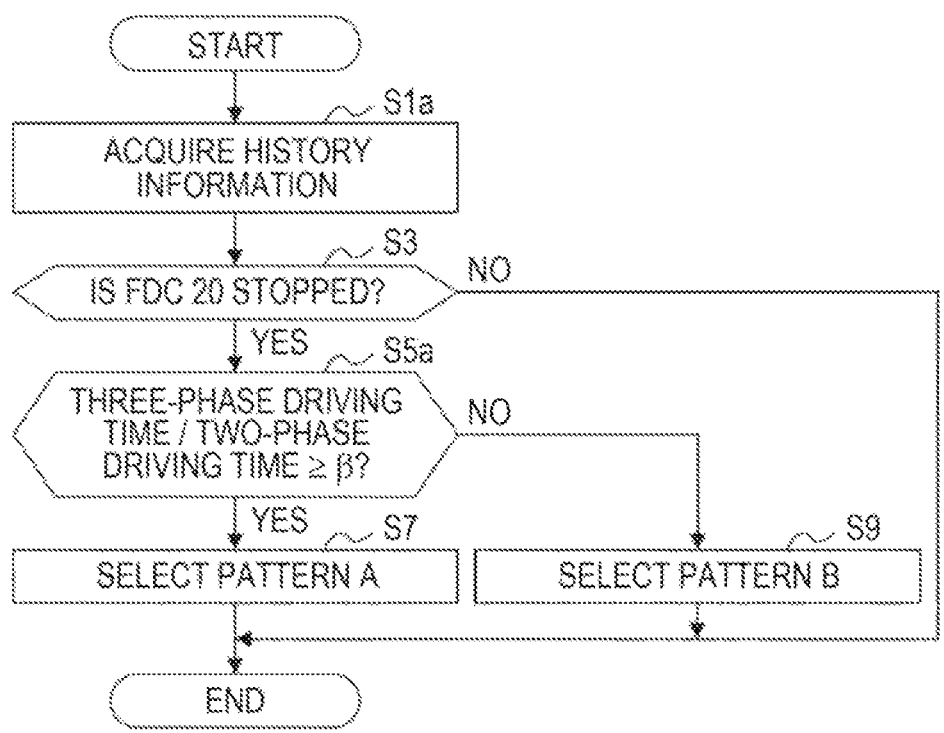
FIG. 12 is a flowchart illustrating an example of pattern selection control according to a first modified example.

A plurality of modified examples will be described below. In the plurality of modified examples, the same elements or the same processes as in the above embodiment will be referred to by the same reference signs and description thereof will not be repeated. FIG. 12 is a flowchart illustrating an example of pattern selection control according to a first modified example. The ECU 4 acquires history information on a drive slate of the FDC 20 (Step S1a). Specifically, the history information on the drive state of the FDC 20 is a cumulative drive time in which the FDC 20 is controlled in two-phase driving and a cumulative drive time in which the FDC 20 is controlled in three-phase driving in the past and is stored in the RAM of the ECU 4. The process of Step S1a is an example of a process which is performed by a history acquiring unit which is functionally realized by the CPU, the ROM, and the RAM of the ECU 4.

When the determination result of Step S3 is YES, it is determined whether a time ratio of the cumulative drive time in which control is performed in three-phase driving to the cumulative drive time in which control is performed in two-phase driving is equal to or greater than a threshold value β (Step S5a). The threshold value β is, for example, 1, but is not limited thereto. The time ratio is an example of the above-mentioned predicted correlation value. The threshold value β is an example of a first threshold value. The ECU 4 selects Pattern A (Step S7) when the determination result of Step S5a is YES, and the ECU 4 selects Pattern B when the determination result of Step S5a is NO (Step S9).

In this way, since which of the time in which control is performed in two-phase driving and the time in which control is performed in three-phase driving is longer is predicted based on the cumulative drive time in which control is actually performed in two-phase driving and the cumulative drive time in which control is actually performed in three-phase driving, it is possible to enhance prediction accuracy and to decrease a burden of a control routine for prediction. As the history information, for example, information within several latest months may be acquired. Accordingly, it is possible to cope with a case in which a driver is changed or change in a driver's driving characteristics. The history information may be updated at intervals of a predetermined period of time, for example, at intervals of one month.

SECOND MODIFIED EXAMPLE

Figure 13:
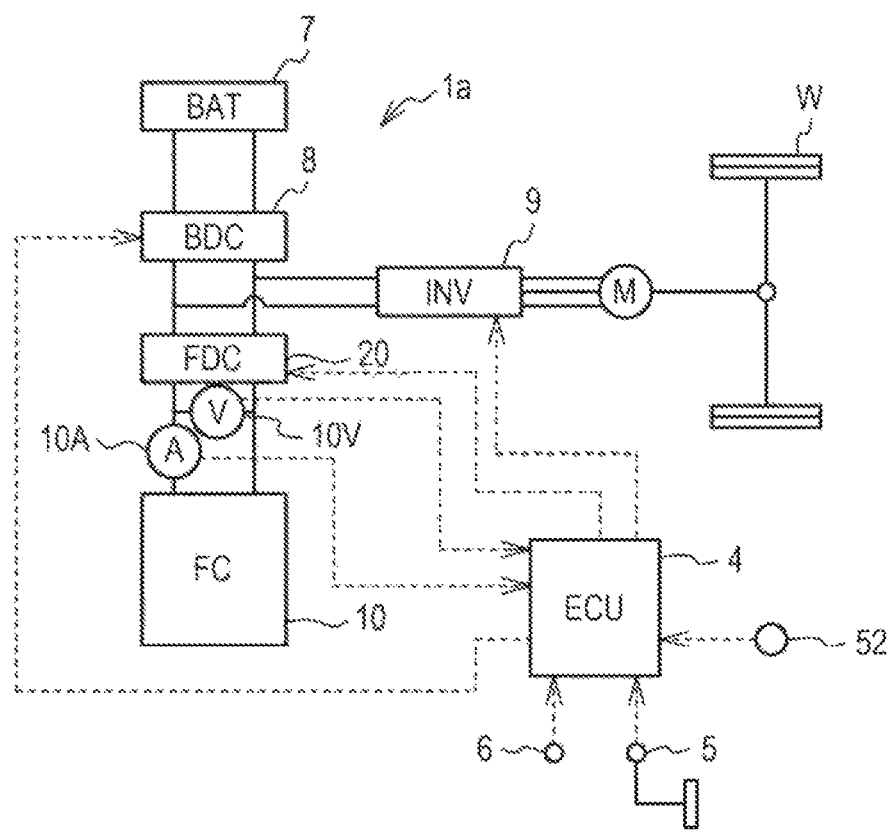
FIG. 13 is a diagram illustrating a configuration of a fuel cell system according to a second modified example.

FIG. 13 is a diagram illustrating a configuration of a fuel cell system 1a according to a second modified example. The fuel cell system 1a includes a drive mode switch 52 that is used to select a drive mode. A driver can select one of a normal mode, a sport mode, and an eco mode as the drive mode by operating the drive mode switch 52. In the sport mode, output responsiveness of the FC 10 to an operation of an accelerator pedal is set to be high. In the eco mode, the output responsiveness of the FC 10 to an operation of an accelerator pedal is set to be low. In the normal mode, the output responsiveness of the FC 10 to an operation of an accelerator pedal is set to be middle between that in the sport mode and that in the eco mode. An output signal of the drive mode which is selected by the drive mode switch 52 is input to the ECU 4.

Figure 14:
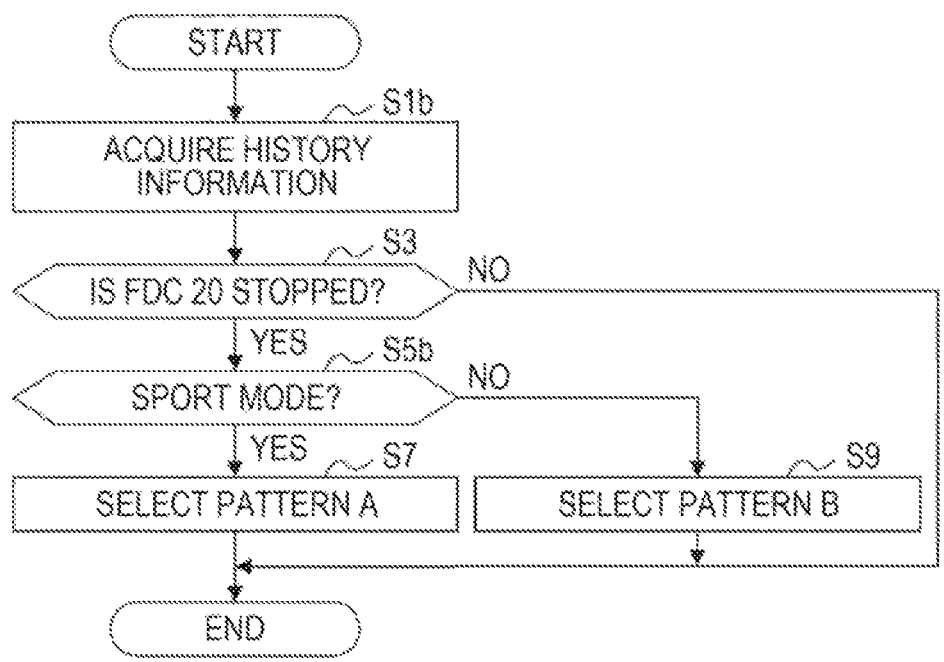
FIG. 14 is a flowchart illustrating an example of pattern selection control according to the second modified example.

FIG. 14 is a flowchart illustrating an example of pattern selection control according to the second modified example. The ECU 4 acquires drive mode information on the drive mode which is currently selected based on the output signal of the drive mode selected by the drive mode switch 52 (Step S1$b$). The process of Step S1$b$ is an example of a process which is performed by a drive mode acquiring unit which is functionally realized by the CPU, the ROM, and the RAM of the ECU 4.

Then, when the determination result of Step S3 is YES, it is determined whether the drive mode is the sport mode (Step S5$b$). When the determination result of Step S5$b$ is YES, the time in which the vehicle is driven at a high speed can be predicted to be relatively long and the drive time of three-phase driving can be predicted to be longer than the drive time of two-phase driving. Specifically, the time ratio which is a ratio of the time in which control is predicted to be performed in three-phase driving to the time in which control is predicted to be performed in two-phase driving in a predetermined period of time can be predicted to be equal to or greater than a threshold value. Accordingly, Pattern A is selected (Step S7). When the determination result of Step S5$b$ is NO, that is, when the drive mode is the normal mode or the eco mode, the time in which the vehicle is driven at a low speed can be predicted to be relatively long and the drive time of two-phase driving can be predicted to be longer than the drive time of three-phase driving. Specifically, the time ratio can be predicted to be less than the threshold value. Accordingly, Pattern B is selected (Step S9).

In this way, the time ratio which is a ratio of the time in which control is predicted to be performed in three-phase driving to the time in which control is predicted to be performed in two-phase driving in the predetermined period of time can be predicted depending on the selected drive mode. Accordingly, the drive mode is an example of the predicted correlation value which is correlated with the time ratio. In this modified example, when the drive mode is the sport mode, it means that the time ratio is equal to or greater than the first threshold value. When the drive mode is the normal mode or the eco mode, it means that the time ratio is less than the first threshold value. The disclosure is not limited thereto and, for example, when the drive mode is the sport mode or the normal mode, the time ratio may be determined to be equal to or greater than the first threshold value and Pattern A may be selected. When the drive mode is the eco mode, the time ratio may be determined to be less than the first threshold value and Pattern B may be selected.

At least two of the predicted current value described in the above embodiment, the history information described in the first modified example, and the drive mode described in the second modified example may be comprehensively considered to select the phase pattern.

THIRD MODIFIED EXAMPLE

Patterns A to C, m=3, n=2

Figure 15A:
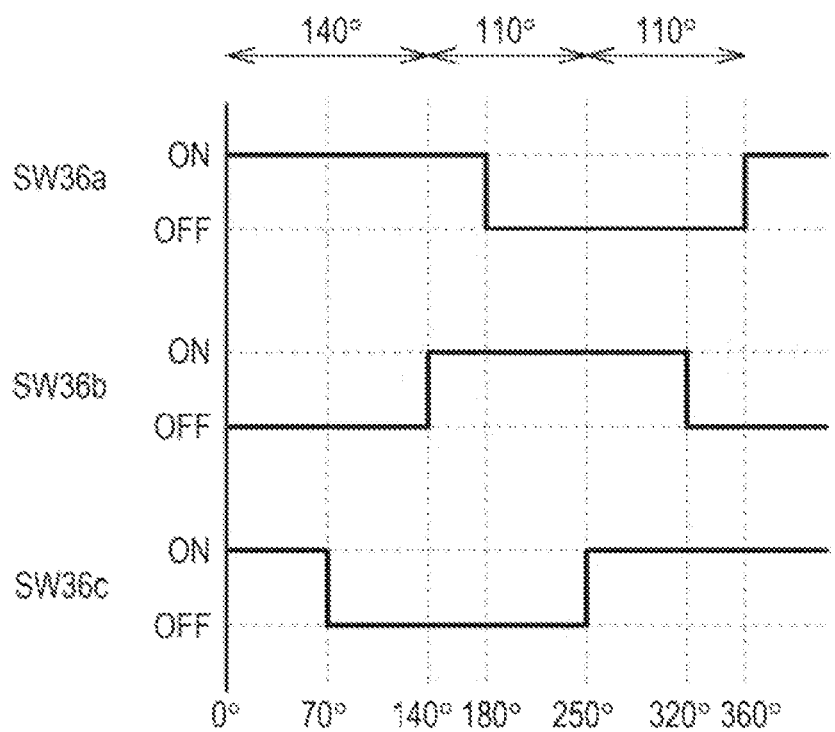
FIG. 15A is a graph illustrating operations of switching elements in three-phase driving based on Pattern C.
Figure 15B:
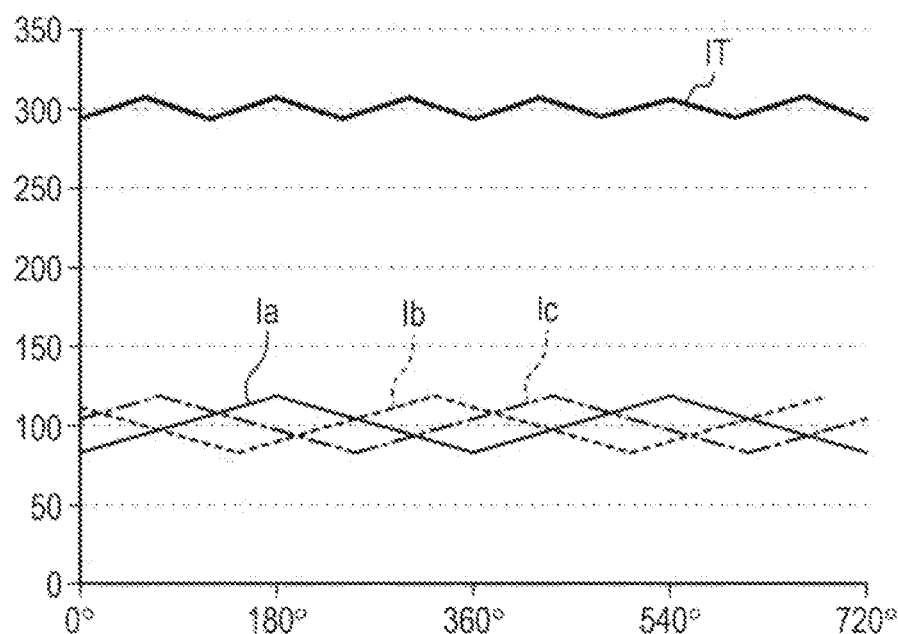
FIG. 15B is a graph illustrating reactor currents and an output current of the step-up converter in three-phase driving based on Pattern C.
Figure 16A:
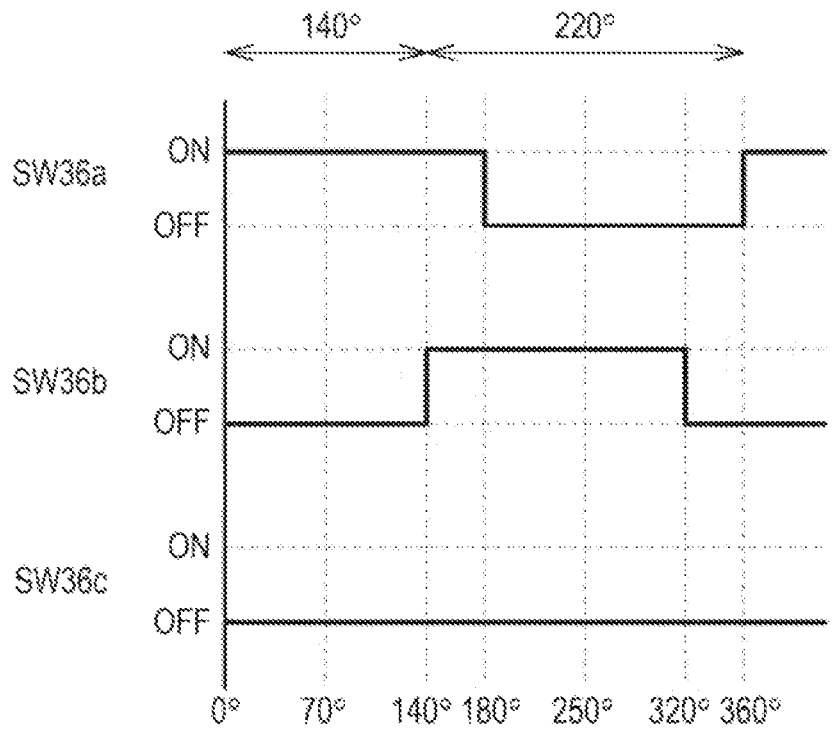
FIG. 16A is a graph illustrating operations of switching elements in two-phase driving based on Pattern C.
Figure 16B:
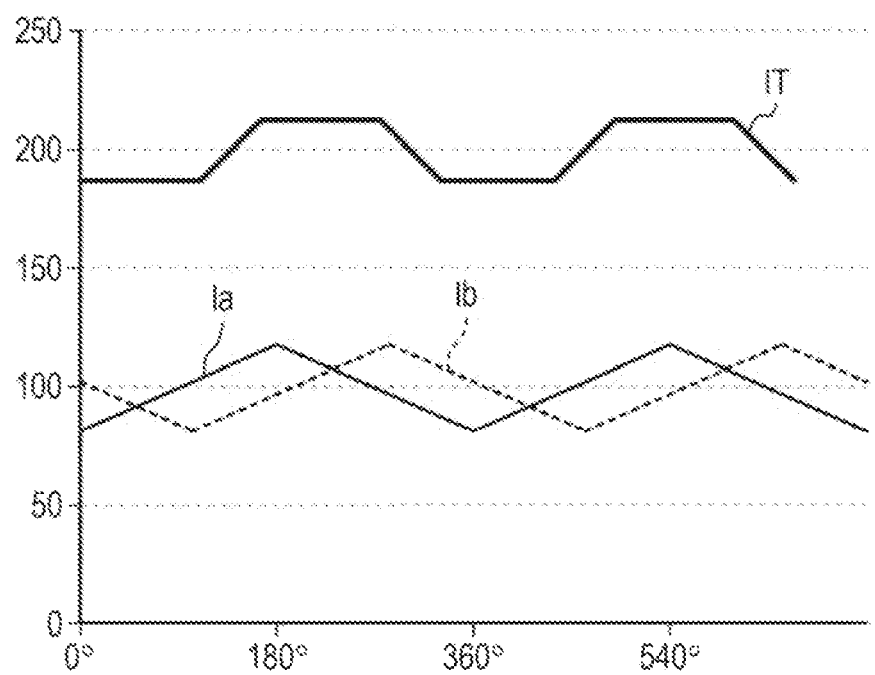
FIG. 16B is a graph illustrating reactor currents and an output current of the step-up converter in two-phase driving based on Pattern C.

In a third modified example, one of Patterns A to C is selected as the phase pattern. Pattern C is stored in advance in the memory of the ECU 4. The phases of SWs 36*a* to 36*c* in Pattern C are 0°, 140°, and 250°, respectively. FIG. 15A is a graph illustrating operations of the SWs 36*a* to 36*c* in three-phase driving based on Pattern C. FIG. 15B is a graph illustrating the reactor currents Ia to Ic and the output current IT of the FDC 20 in three-phase driving based on Pattern C. FIG. 16A is a graph illustrating operations of the SWs 36*a* to 36*c* in two-phase driving based on Pattern C. FIG. 16B is a graph illustrating the reactor currents Ia and Ib and the output current IT of the FDC 20 in a two-phase driving based on Pattern C.

Figures 17A, 17B:
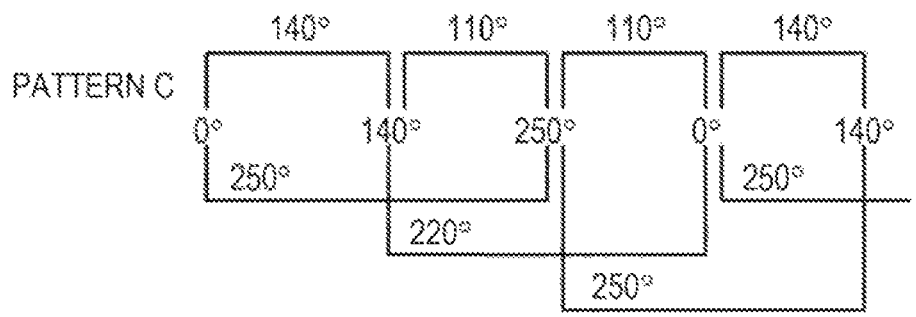
FIG. 17A is a table for comparing a magnitude of a ripple current between Patterns A to C.
FIG. 17B is a diagram illustrating phases and phase differences in Pattern C.

FIG. 17A is a table for comparison of the magnitude of the ripple current between Patterns A to C. When the same current value is made to flow in the phases and the magnitude of the ripple current of the output current IT in one-phase driving is defined as being I, the magnitude of the ripple current of the output current IT in two-phase driving based on Pattern C is 4/9 and the magnitude of the ripple current in three-phase driving based on Pattern C is 5/9. In comparison between Patterns A to C, the ripple current in two-phase driving is less in Pattern C than in Pattern A and greater than in Pattern B. The ripple current in three-phase driving is less in Pattern C than in Pattern B and greater than in Pattern A.

FIG. 17B is a diagram illustrating phases and phase differences in Pattern C. The phase differences in Pattern C are defined as follows. The phase difference $D_{C(a\text{-}b)}$ between the SW 36*a* and the SW 36*b* is 140°. The phase difference $D_{C(b\text{-}c)}$ between the SW 36*b* and the SW 36*c* and the phase difference $D_{C(c\text{-}a)}$ between the SW 36*c* and the SW 36*a* are 110°.

Which of Patterns A and C is a pattern suitable for two-phase driving can be identified as follows. The maximum value of the phase differences $D_{C(a\text{-}b)}$, $D_{C(b\text{-}c)}$, and $D_{C(c\text{-}a)}$ in Pattern C is $D_{C(a\text{-}b)}$=140°. The absolute value of a difference between the maximum value in Pattern C and 180° is 40°. On the other hand, since all the phase differences between two switching elements which are sequentially turned on in three-phase driving based on Pattern A are 120° as described above, the maximum value thereof is 120° and the absolute value of the difference between 120° and 180° is 60°. The absolute value is less in Pattern C than in Pattern A. Accordingly, Pattern C is more suitable for two-phase driving than Pattern A. In other words, Pattern A is more suitable for three-phase driving than Pattern C.

Similarly, which of Patterns B and C is a pattern suitable for two-phase driving can be identified as follows. As described above, the absolute value in Pattern B is 0° and the absolute value in Pattern C is 40°. Since the absolute value is less in Pattern B than in Pattern C, Pattern B is more suitable for two-phase driving than Pattern A. In other words, Pattern C is more suitable for three-phase driving titan Pattern B. Conclusively, Pattern C is not more suitable for three-phase driving than Pattern A but more suitable for three-phase driving than Pattern B, and is not more suitable for two-phase driving than Pattern B but more suitable for two-phase driving than Pattern A. Accordingly, with Pattern C, it is possible to curb a great increase of the ripple current in both two-phase driving and three-phase driving.

In Pattern C, the maximum value $D_{C(a-b)}$ of the phase differences satisfies the following conditions.

$$120°(=360°/m=360°/3)<D_{C(a-b)}<180°(=360°/n=360°/2)$$

$$D_{C(a-b)}<D_{C(a-c)}<360°(=(360°/m)\times 3=(360°/3)\times 3)$$

Since $D_{C(a-b)}=140°$ and $D_{C(a-c)}=250°$, the above conditions are satisfied. On the other hand, in Pattern A, since $D_{A(a-b)}=120°$, $120°<D_{A(a-b)}$ is not satisfied. In Pattern B, since $D_{B(a-b)}=180°$, $D_{B(a-b)}<180°$ is not satisfied. Since Pattern C satisfies these conditions, Pattern C is not more suitable for three-phase driving than Pattern A but more suitable for three-phase driving than Pattern B, and is not more suitable for two-phase driving than Pattern B but is more suitable for two-phase driving than Pattern A.

The switching element of which on/off control is to be stopped at the time of two-phase driving based on Pattern C can be identified as follows. As illustrated in FIG. 17B, in Pattern C, live phase difference $D_{C(a-c)}$ between the SW 36a and the SW 36c is 250°, the phase difference $D_{C(b-a)}$ between the SW 36b and the SW 36a is 220°, and the phase difference $D_{C(c-b)}$ between the SW 36c and the SW 36b is 250°. Out of these three phase differences, the phase difference $D_{C(b-a)}$ has a minimum value. The switching element of which on/off control is to be stopped is the SW 36c which is turned on between the on timing of the SW 36b and the on timing of the SW 36a which define the minimum phase difference. The phase differences when on/off control of the SW 36c is stopped at the time of two-phase driving are $D_{C(a-b)}=140°$ and $D_{C(b-a)}=220°$.

For example, the phase differences when on/off control of the SW 36a is stopped at the time of two-phase driving based on Pattern C are $D_{C(b-c)}=110°$ and $D_{C(c-b)}=250°$. Here, the absolute value of the difference between $D_{C(b-c)}$ and 180° and the absolute value of the difference between $D_{C(c-b)}$ and 180° are 70°. The phase differences when on/off control of the SW 36b is stopped at the time of two-phase driving are $D_{C(a-c)}=250°$ and $D_{C(c-a)}=110°$. Here, the absolute value of the difference between $D_{C(a-c)}$ and 180° and the absolute value of the difference between $D_{C(c-a)}$ and 180° are 70°. On the other hand, when on/off control of the SW 36c is stopped at the time of two-phase driving, the absolute value of the difference between $D_{C(a-b)}$ and 180° and the absolute value of the difference between $D_{C(b-a)}$ and 180° are 40°. As described above, when on/off control of the SW 36c is stopped at the time of two-phase driving, the absolute value decreases and it is suitable for two-phase driving.

At the time of one-phase driving, similarly to Patterns A and B, on/off control of two of the SWs 36a to 36c has only to be stopped in Pattern C.

Figure 18:
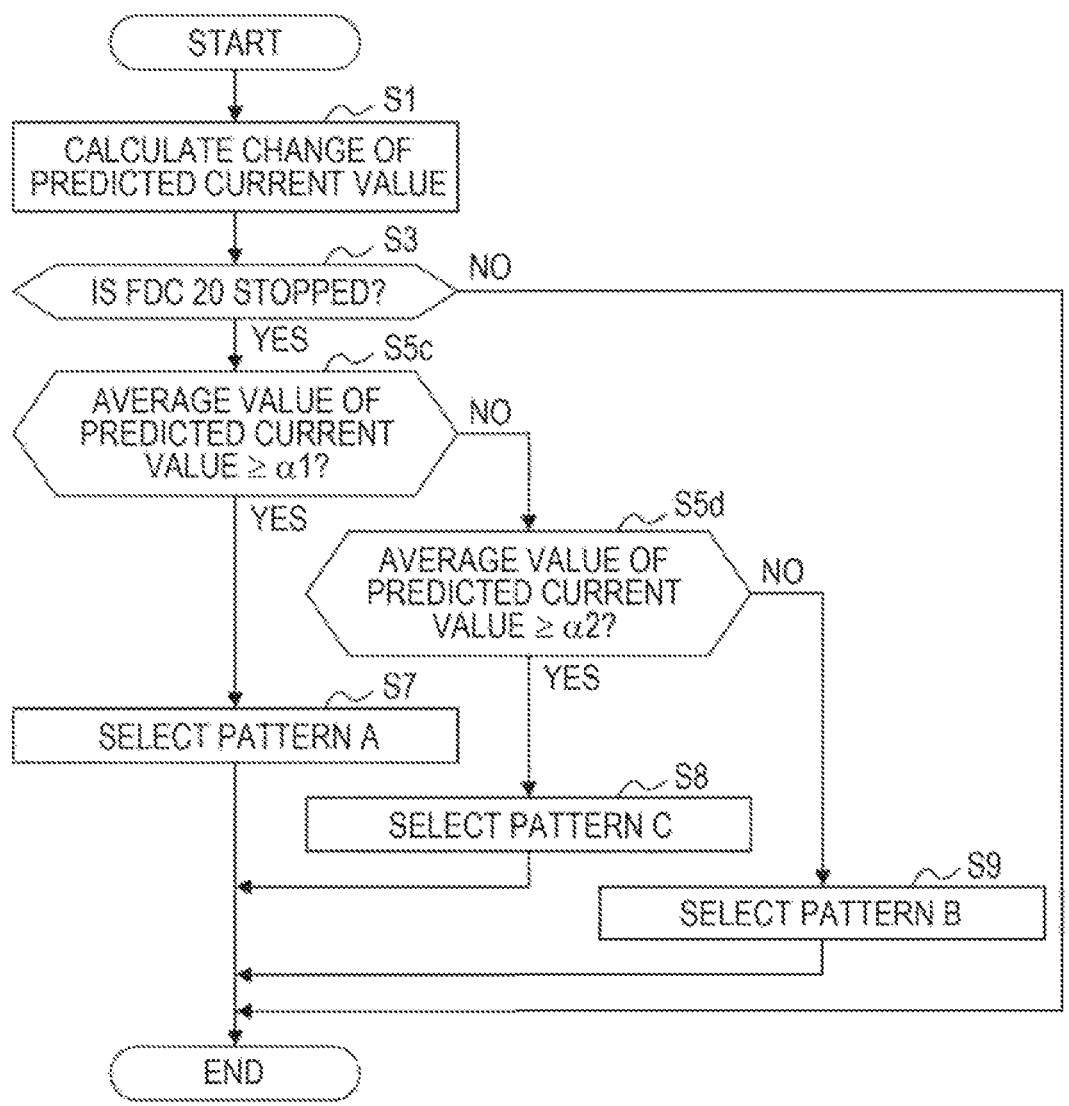
FIG. 18 is a flowchart illustrating an example of pattern selection control according to a third modified example.

FIG. 18 is a flowchart illustrating an example of pattern selection control according to the third modified example. When the determination result of Step S3 is YES, it is determined whether the average value of the predicted current values is equal to or greater than a threshold value $\alpha 1$ (Step S5c). Pattern A is selected when the determination result of Step S5c is YES (Step S7). and it is determined whether the average value of the predicted current values is equal to or greater than a threshold value $\alpha 2$ when the determination result of Step S5c is NO (Step S5d). Here, the threshold value $\alpha 2$ is less than the threshold value $\alpha 1$. The threshold value $\alpha 1$ is an example of a first threshold value and the threshold value $\alpha 2$ is an example of a second threshold value which is less than the first threshold value $\alpha 1$. When the determination result of Step S5d is NO, Pattern B is selected (Step S9). When the determination result of Step S5d is YES, Pattern C is selected (Step S8).

In this way, when the average value of the predicted current values is less than the threshold value $\alpha 1$ and equal to or greater than the threshold value $\alpha 2$, it can be predicted that a time ratio (a ratio of the time in which control is predicted to be performed in three-phase driving to the time in which control is predicted to be performed in two-phase driving in a predetermined period of time) is not as high as when the predicted current values are equal to or greater than the threshold value $\alpha 1$ and the time ratio is not as low as when the predicted current values are less than the threshold value $\alpha 2$. Accordingly, by selecting Pattern C in this case, it is possible to achieve a decrease in the ripple current of the output current IT at the time of both two-phase driving and three-phase driving.

In the third modified example, similarly to the first modified example, the history information of the FDC 20 may be acquired, it may be determined in Step S5c whether the time ratio of the cumulative drive time of three-phase driving to the cumulative drive time of two-phase driving is equal to or greater than the first threshold value, and it may be determined in Step S5d whether the time ratio is equal to or greater than the second threshold value. In the third modified example, in a vehicle in which the drive mode can be selected as described above in the second modified example, it may be determined in Step S5c whether the drive mode is the sport mode and it may be determined in Step S5d whether the drive mode is the normal mode. At least two of the predicted current value, the history information described in the first modified example, and the drive mode described in the second modified example may be comprehensively considered to select the phase pattern.

FOURTH MODIFIED EXAMPLE

Patterns A to D, m=3, n=2

Figure 19A:
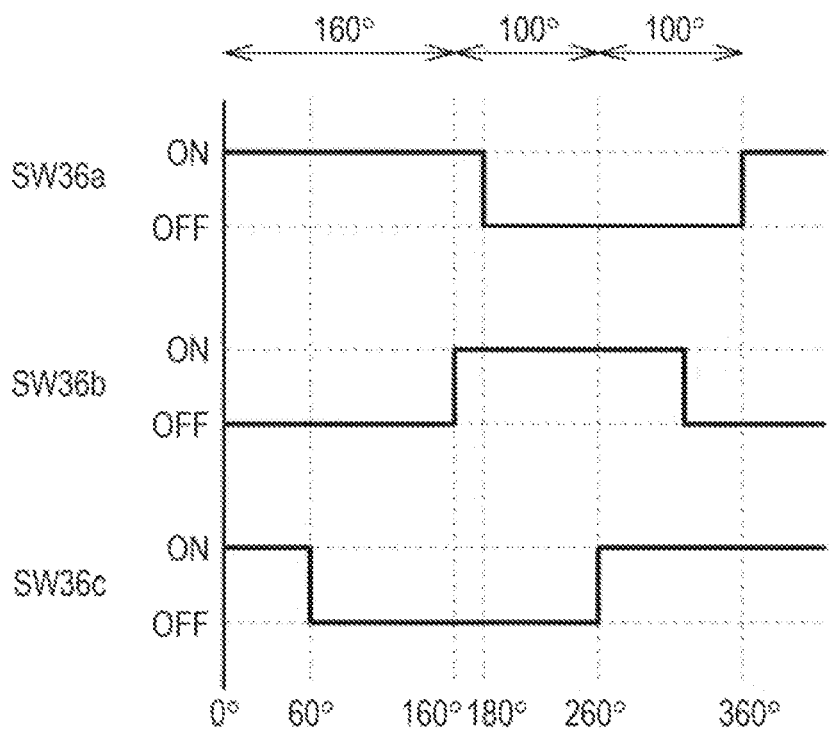
FIG. 19A is a graph illustrating operations of switching elements in three-phase driving based on Pattern D.
Figure 19B:
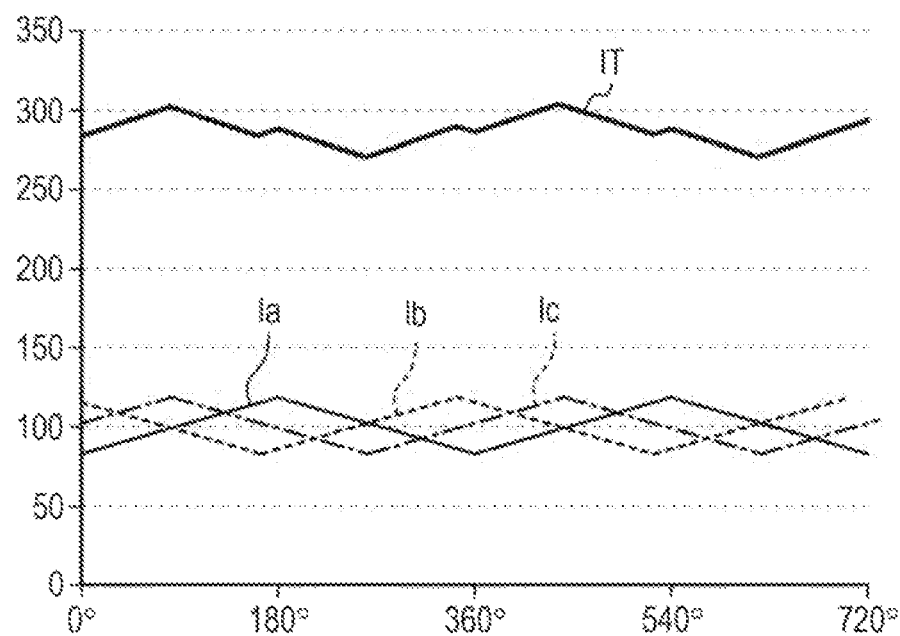
FIG. 19B is a graph illustrating reader currents and an output current of the step-up converter in three-phase driving based on Pattern D.
Figure 20A:
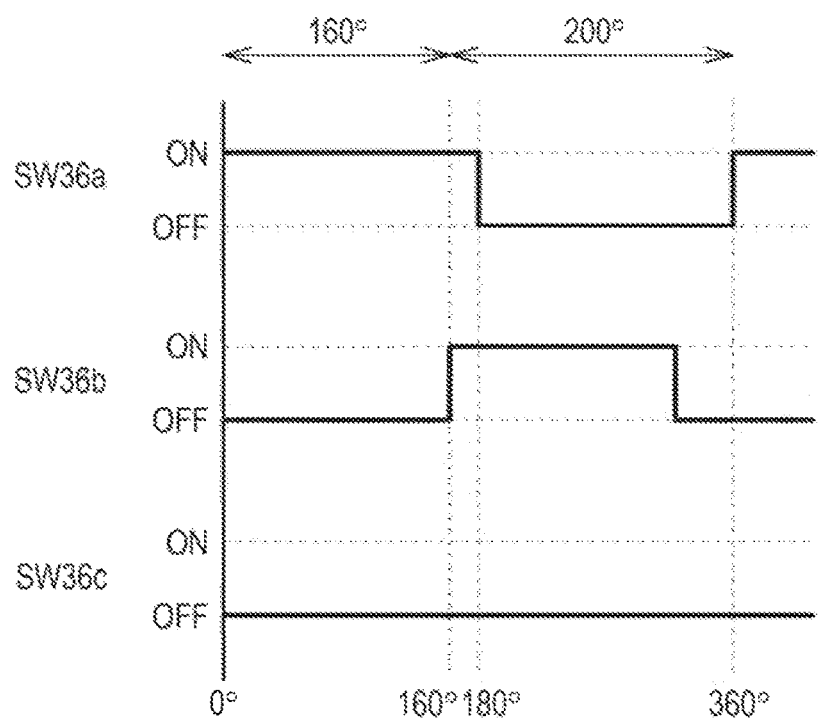
FIG. 20A is a graph illustrating operations of switching elements in two-phase driving based on Pattern D.
Figure 20B:
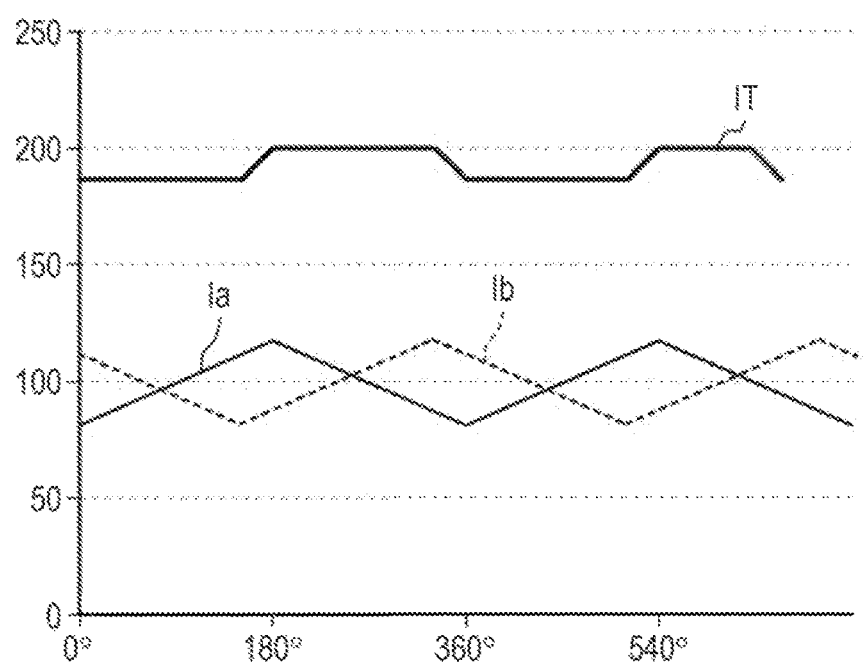
FIG. 20B is a graph illustrating reactor currents and an output current of the step-up converter in two-phase driving based on Pattern D.

In a fourth modified example, one of Patterns A to D is selected as the phase pattern. Pattern D is stored in advance in the memory of the ECU 4. The phases of SWs 36a to 36c in Pattern D are 0°, 160°, and 260°, respectively. FIG. 19A is a graph illustrating operations of the SWs 36a to 36c in three-phase driving based on Pattern D. FIG. 19B is a graph illustrating the reactor currents Ia to Ic and the output current IT of the FDC 20 in three-phase driving based on Pattern D. FIG. 20A is a graph illustrating operations of the SWs 36a to 36c in two-phase driving based on Pattern D. FIG. 20B is a graph illustrating the reactor currents Ia and Ib and the output current IT of the FDC 20 in two-phase driving based on Pattern D.

Figures 21A, 21B:
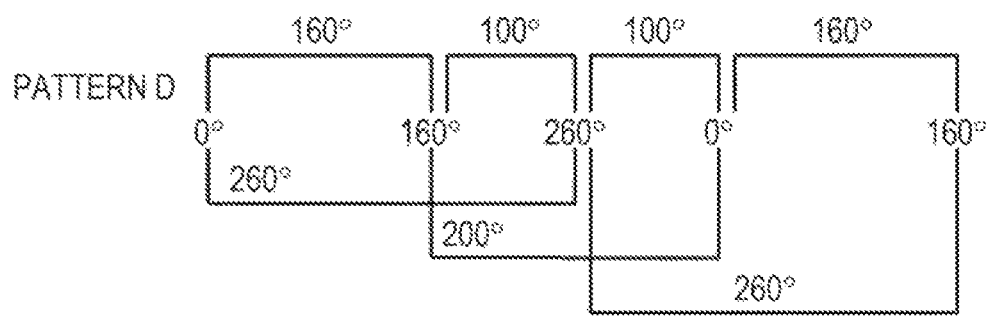
FIG. 21A is a table for comparing a magnitude of a ripple current between Patterns A to D.
FIG. 21B is a diagram illustrating phases and phase differences in Pattern D.

FIG. 21A is a table for comparison of the magnitude of the ripple current between Patterns A to D. When the same current value is made to flow in the phases and the magnitude of the ripple current of the output current IT in one-phase driving is defined as being I, the magnitude of the ripple current of the output current IT in two-phase driving based on Pattern D is ⅔ and the magnitude of the ripple current in three-phase driving based on Pattern D is ⅞. In comparison between Patterns A to D, the ripple current in two-phase driving is less in Pattern D than in Pattern C and greater than in Pattern B. The ripple current in three-phase driving is less in Pattern D than in Pattern B and greater than in Pattern C.

FIG. 21B is a diagram illustrating phases and phase differences in Pattern D. In Pattern D, the phase difference $D_{D(a-b)}$ between the SW 36a and the SW 36b is 160° and the phase difference $D_{D(b-c)}$ between the SW 36b and the SW 36c and the phase difference $D_{D(c-a)}$ between the SW 36c and the SW 36a are 100°.

Which of Patterns C and D is a pattern suitable for two-phase driving can be identified as follows. The maximum value of the phase differences $D_{D(a-b)}$, $D_{D(b-c)}$, and $D_{D(c-a)}$ in Pattern D is $D_{D(a-b)}=160°$. The absolute value of a difference between the maximum value in Pattern D and 180° is 20°. On the other hand, the absolute value in Pattern C is 40° as described above. The absolute value is less in Pattern D than in Pattern C. Accordingly, Pattern D is more suitable for two-phase driving than Pattern C. In other words, Pattern C is more suitable for three-phase driving than Pattern D.

Similarly, which of Patterns B and D is a pattern suitable for two-phase driving can be identified as follows. As described above, the maximum value in Pattern B is 0° and the absolute value in Pattern D is 20°. In this way, since the absolute value is less in Pattern B than in Pattern D, Pattern B is more suitable for two-phase driving than Pattern D. In other words, Pattern D is more suitable for three-phase driving than Pattern B. Conclusively, Pattern D is not more suitable for three-phase driving than Patterns A and C but is more suitable for three-phase driving than Pattern B, and is not more suitable for two-phase driving than Pattern B but is more suitable for two-phase driving than Patterns A and C. Accordingly, with Pattern D, similarly to Pattern C, it is possible to curb a great increase of the ripple current in both two-phase driving and three-phase driving in comparison with Patterns A and B.

In Pattern D, tine maximum value $D_{D(a-b)}$ of the phase differences satisfies the following conditions.

$$120°(=360°/m=360°/3) < D_{D(a-b)} < 180°(=360°/n=360°/2)$$

$$D_{D(a-b)} < D_{D(a-c)} < 360°(=(360°/m) \times 3 = (360°/3) \times 3)$$

Since $D_{D(a-b)}=160°$ and $D_{D(a-c)}=260°$, the above conditions are satisfied.

The switching element of which on/off control is to be stopped at the time of two-phase driving based on Pattern D can be identified as follows. As illustrated in FIG. 21B, in Pattern D, the phase difference between the SW 36a and the SW 36c is 260°, the phase difference $D_{D(c-b)}$ between the SW 36b and the SW 36a is 200°, and the phase difference $D_{D(c-b)}$ between the SW 36c and the SW 36b is 260°. Out of these three phase differences, the phase difference $D_{D(b-a)}$ has a minimum value. The switching element of which cutoff control is to be stopped is the SW 36c which is turned on between the on timing of the SW 36b and the on timing of the SW 36a which define the minimum phase difference. The phase differences when on/off control of the SW 36c is stopped at the time of two-phase driving are $D_{D(a-b)}=160°$ and $D_{D(b-a)}=200°$.

For example, the phase differences when on/off control of the SW 36a is stopped at the time of two-phase driving are $D_{D(b-c)}=100°$ and $D_{D(c-b)}=260°$. Here, the absolute value of the difference between $D_{D(b-c)}$ and 180° and the absolute value of the difference between $D_{D(a-b)}$ and 180° are 80°. The phase differences when on/off control of the SW 36b is stopped at the time of two-phase driving are $D_{D(a-c)}=260°$ and $D_{D(c-a)}=100°$. Here, the absolute value of the difference between $D_{D(a-c)}$ and 180° and the absolute value of the difference between $D_{D(c-a)}$ and 180° are 80°. On the other hand, when on/off control of the SW 36c is stopped at the time of two-phase driving, the absolute value of the difference between $D_{D(a-b)}$ and 180° and the absolute value of the difference between $D_{D(b-a)}$ and 180° are 20°. As described above, when on/off control of the SW 36c is stopped at the time of two-phase driving, the absolute value decreases and it is suitable for two-phase driving.

In one-phase driving based on Pattern D, two of the SWs 36a to 36c have only to be stopped.

Figure 22:
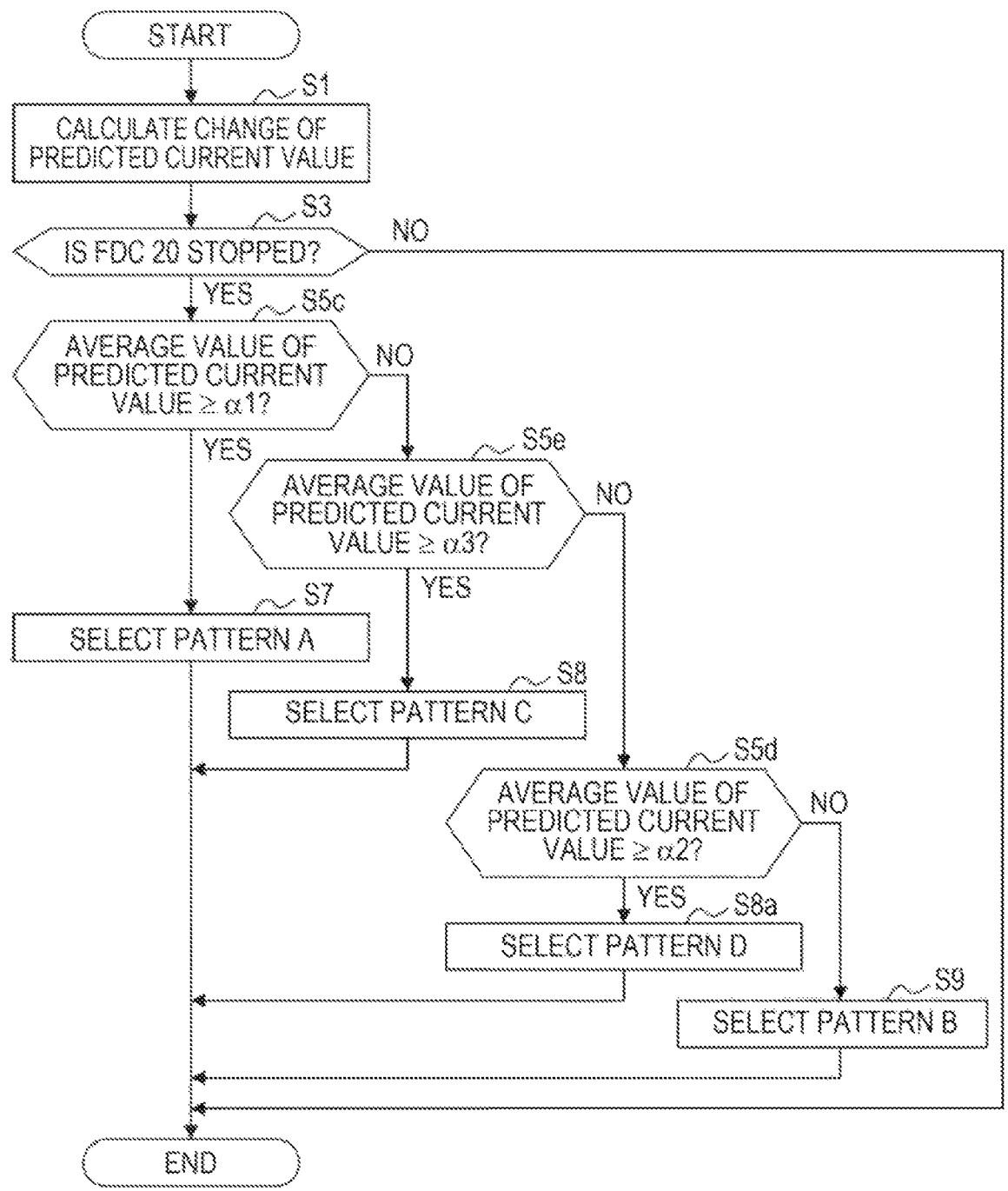
FIG. 22 is a flowchart illustrating an example of pattern selection control according to a fourth modified example.

FIG. 22 is a flowchart illustrating an example of pattern selection control according to the fourth modified example. Pattern A is selected when the determination result of Step S5c is YES (Step S7), and it is determined whether the average value of the predicted current values is equal to or greater than a threshold value α3 when the determination result of Step S5e is NO (Step S5e). Here, the threshold value α3 is a value between the threshold value α1 and the threshold value α2. Pattern C is selected when the determination result of Step S5e is YES (Step S8). When the determination result of Step S5e is NO, the determination of Step S5d is performed. When the determination result of Step S5d is YES, Pattern D is selected (Step S8a). When the determination result of Step S5d is NO, Pattern B is selected (Step S9). In this way, by selecting a more suitable phase pattern depending on the average value of the predicted current values, it is possible to effectively decrease the ripple current of the output current IT.

In the fourth modified example, for example, when the drive mode of the vehicle can be selected from an eco mode, a comfort mode, a normal mode, and a sport mode, it may be determined in Step S5c whether the drive mode is the sport mode, it may be determined in Step S5e whether the drive mode is the normal mode, and it may be determined in Step S5d whether the drive mode is the comfort mode, in the comfort mode, output responsiveness of the FC 10 to an operation of an accelerator pedal is set to be middle between the normal mode and the eco mode.

FIFTH MODIFIED EXAMPLE

Patterns C and D, m=3, n=2

Figure 23:
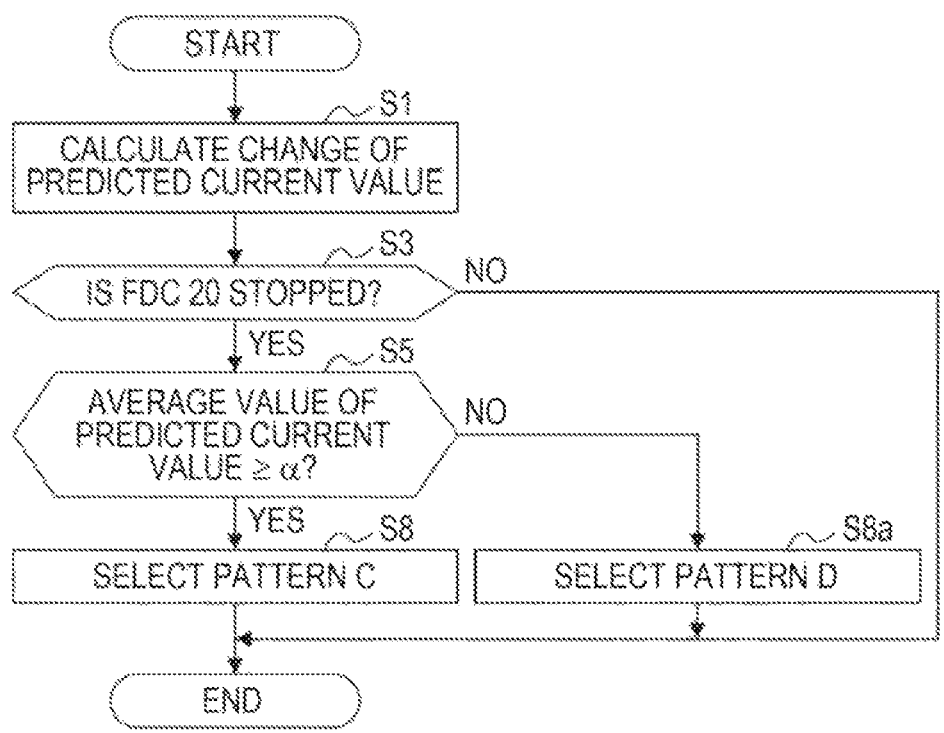
FIG. 23 is a flowchart illustrating an example of pattern selection control according to a fifth modified example.

In a fifth modified example, Pattern C or D is selected. Patterns C and D are stored in advance in the memory of the ECU 4, but Patterns A and B are not stored. FIG. 23 is a flowchart illustrating an example of pattern selection control in the fifth modified example. The ECU 4 selects Pattern C when the determination result of Step S5 is YES (Step S8). and the ECU 4 selects Pattern D when the determination result of Step S5 is NO (Step S8a). As described above, Pattern D is more suitable for two-phase driving than Pattern C, that is, Pattern C is more suitable for three-phase driving than Pattern D.

Pattern A is more suitable for three-phase driving than Pattern C, but Pattern A is not more suitable for two-phase driving than Pattern C. Accordingly, even when the average value of the predicted current values is equal to or greater than the threshold value α, it is possible to achieve a decrease of the ripple current in both two-phase driving and three-phase driving by selecting Pattern C instead of Pattern A. Pattern B is more suitable for two-phase driving than Pattern D, but Pattern B is not more suitable for three-phase driving than Pattern D. Accordingly, even when the average value of the predicted current values is less than the threshold value α, it is possible to achieve a decrease of the ripple current in both two-phase driving and three-phase driving by selecting Pattern D instead of Pattern B.

A combination of phase patterns which can be selected is not limited to those described above in the embodiment and the modified examples. For example, the combination of phase patterns which can be selected may be one of a combination of Patterns A and C, a combination of Patterns A and D, a combination of Patterns B and C, a combination of Patterns A, B, and D, a combination of Patterns A, C, and D, and a combination of Patterns B, C, and D.

SIXTH MODIFIED EXAMPLE

Patterns E to G, m=4, n=3

Figure 24:
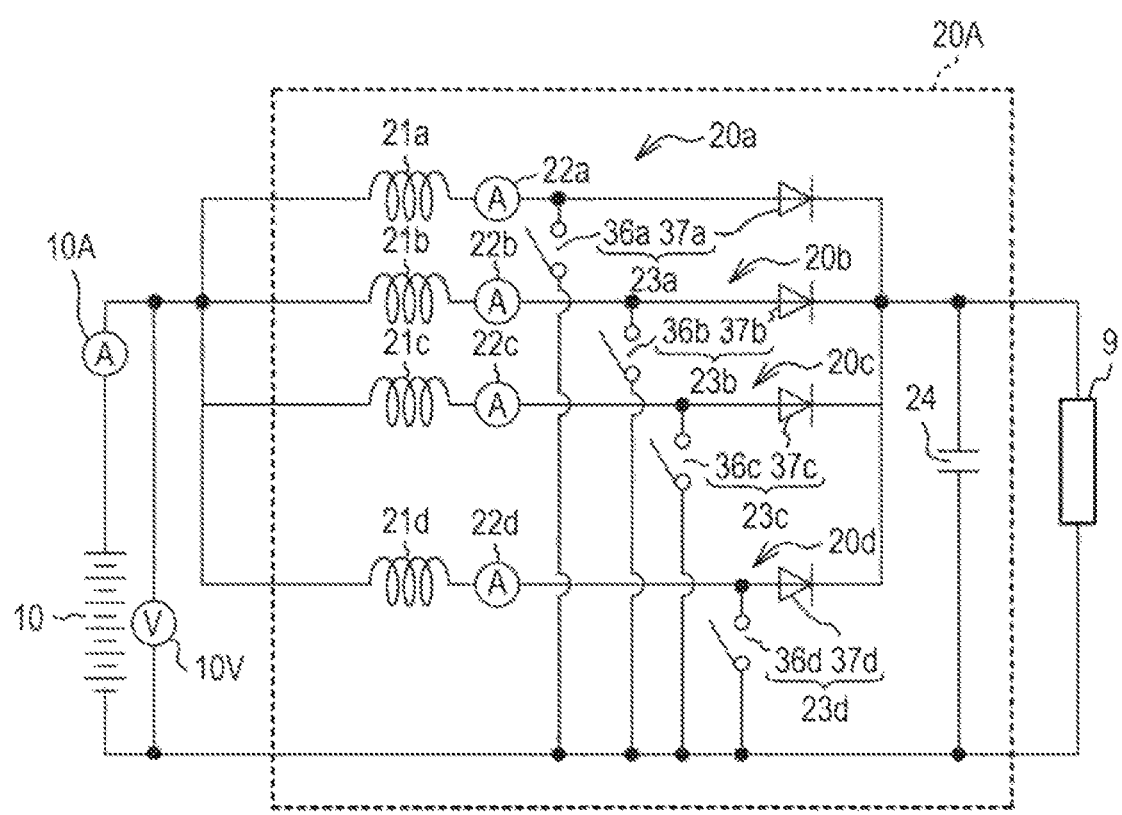
FIG. 24 is a diagram illustrating a circuit configuration of a step-up converter according to a sixth modified example.

FIG. 24 is a diagram illustrating a circuit configuration of an FDC 20A according to a sixth modified example. The FDC 20A includes converter circuits 20a to 20d of four phases. The converter circuit 20d includes a reactor 21d, a current sensor 22d, and an IPM 23d. The IPM 23d includes a SW 36d and a diode 37d. In the sixth modified example, one-phase driving is sequentially switched to four-phase driving with an increase in the input current of the FDC 20A, but the disclosure is not limited thereto and, for example, the driving may be switched in the order of one-phase driving, three-phase driving, and four-phase driving, may be switched in the order of two-phase driving, three-phase driving, and four-phase driving, or may be switched in the order of three-phase driving and four-phase driving.

Figure 25:
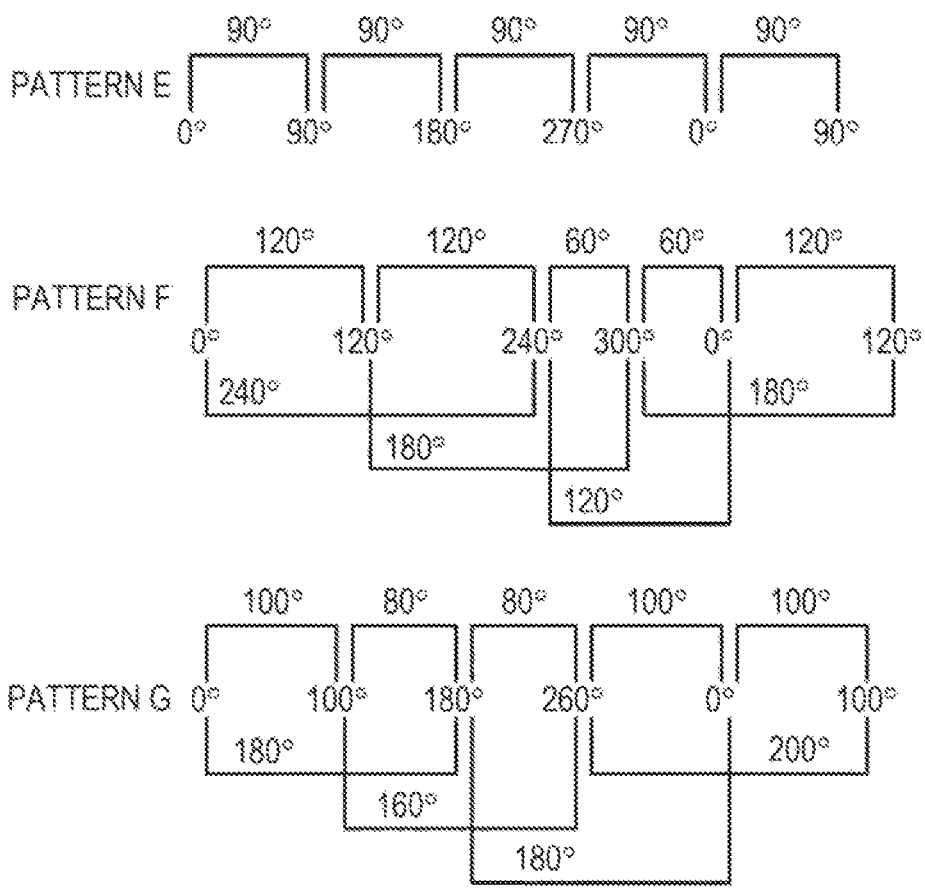
FIG. 25 is a diagram illustrating phases and phase differences in Patterns E to G.

FIG. 25 is a diagram illustrating phases and phase differences of Patterns E to G. The phases of the SWs 36a to 36d in Pattern E are 0°, 90°, 180°, and 270°, respectively. The phases of the SWs 36a to 36d in Pattern F are 0°, 120°, 240°, and 300°, respectively. The phases of the SWs 36a to 36d in Pattern G are 0°, 100°, 180°, and 260°, respectively. The phase differences in Pattern E are $D_{E(a-b)}=D_{D(b-c)}=D_{E(c-d)}=D_{E(d-a)}=90°$. The phase differences in Pattern F are $D_{F(a-b)}=D_{F(b-c)}=120°$ and $D_{F(c-d)}=D_{F(d-a)}=60°$. The phase differences in Pattern G are $D_{G(a-b)}=D_{G(d-a)}=100°$ and $D_{G(b-c)}=D_{G(c-d)}=80°$.

Which of Patterns E to G is suitable for three-phase driving can be identified as follows. All the phase differences in Pattern E are 90° and the maximum value thereof is 90°. The maximum value of the phase differences in Pattern F is 120°. The maximum value of the phase differences in Pattern G is 100°. The absolute value of a difference between the maximum value and 120° in Pattern E is 30°. The absolute value of a difference between the maximum value and 120° in Pattern F is 0°. The absolute value of a difference between the maximum value and 120° in Pattern G is 20°. Here, 120° is a value calculated by 360°/n=360°/3 and is a phase difference at which the ripple current of the output current IT is minimized at the time of three-phase driving. The absolute value is the least in Pattern F and the greatest in Pattern E. Accordingly, Pattern E is most suitable for four-phase driving, Pattern F is most suitable for three-phase driving, and Pattern G is not more suitable for four-phase driving but more suitable for three-phase driving than Pattern E and is not more suitable for three-phase driving but more suitable for four-phase driving than Pattern F.

In Pattern G, the maximum value $D_{G(a-b)}$ of the phase differences satisfies the following conditions.

$$90°(=360°/m=360°/4)<D_{G(a-b)}<120°$$
$$(=360°/n=360°/3)$$

$$D_{G(a-b)}<D_{G(a-c)}<270°(=(360°/m)\times 3=(360°/4)\times 3)$$

Since $D_{G(a-b)}=100°$ and $D_{G(a-c)}=180°$, the above conditions are satisfied. On the other hand, in Patterns E and F, $D_{E(a-b)}=90°$, $90°<D_{E(a-b)}$ is not satisfied, $D_{F(a-b)}=120°$, and $D_{F(a-b)}<120°$ is not satisfied. Since these conditions are satisfied, Pattern G is not more suitable for four-phase driving but more suitable for three-phase driving than Pattern E, and is not more suitable for three-phase driving but more suitable for four-phase driving than Pattern F.

The switching element of which on/off control is to be stopped at the time of three-phase driving based on Pattern F can be identified as follows. As illustrated in FIG. 25, in Pattern F, the phase difference $D_{F(a-c)}$ between the SW 36a and the SW 36c is 240°, the phase difference $D_{F(b-d)}$ between the SW 36b and the SW 36d is 180°, the phase difference $D_{F(c-a)}$ between the SW 36c and the SW 36a is 120°, and the phase difference $D_{F(d-b)}$ between the SW 36d and the SW 36b is 180°. Out of these four phase differences, the phase difference $D_{F(c-a)}$ has a minimum value. The switching element of which on/off control is to be stopped is the SW 36d which is turned on between the SW 36c and the SW 36a which define the minimum phase difference. The phase differences when on/off control of the SW 36d is stopped at the time of three-phase driving are $D_{F(a-b)}=D_{F(b-c)}=D_{F(c-a)}=120°$, and it is possible to curb the ripple current of the output current IT in three-phase driving based on Pattern F.

The switching element of which on/off control is to be stopped at the time of three-phase driving based on Pattern G can be identified as follows. The phase difference $D_{G(a-c)}$ between the SW 36a and the SW 36c is 180°, the phase difference $D_{G(b-d)}$ between the SW 36b and the SW 36d is 160°, the phase difference $D_{G(c-a)}$ between the SW 36c and the SW 36a is 180°, and the phase difference $D_{G(d-b)}$ between the SW 36d and the SW 36b is 200°. Out of these phase differences, the phase difference $D_{G(b-d)}$ has a minimum value. The switching element of which on/off control is to be stopped is the SW 36c which is turned on between the SW 36b and the SW 36d which define the minimum phase difference. The phase differences when on/off control of the SW 36c is stopped at the time of three-phase driving are $D_{G(a-b)}=D_{G(d-a)}=100°$ and $D_{G(b-d)}=160°$.

For example, when on/off control of the SW 36a is stopped at the time of three-phase driving based on Pattern G, the maximum value of the phase differences between two switching elements which are sequentially turned on is $D_{G(d-b)}=200°$. When on/off control of the SW 36b is stopped at the time of three-phase driving based on Pattern G, the maximum value of the phase differences between two switching elements which are sequentially turned on is $D_{G(a-c)}=180°$. When on/off control of the SW 36d is stopped at the time of three-phase driving based on Pattern G, the maximum value of the phase differences between two switching elements which are sequentially turned on is $D_{G(d-a)}=180°$. The absolute value of the difference between $D_{G(d-b)}$ and 120° is 80°. The absolute value of the difference between $D_{G(a-c)}$ and 120° is 60°. The absolute value of the difference between $D_{G(c-a)}$ and 120° is 60°. On the other hand, when on/off control of the SW 36c is stopped at the time of three-phase driving, the maximum value of the phase differences is $D_{G(b-d)}=160°$ and the absolute value of the difference between $D_{G(b-d)}$ and 120° is 40°. As described above, when on/off control of the SW 36c is stopped at the time of three-phase driving, the absolute value decreases and it is suitable for three-phase driving.

For example, in the sixth modified example, as illustrated in FIG. 18, Pattern E may be selected as the phase pattern when the determination result of Step S5c is YES, the phase pattern may be switched to Pattern G when the determination result of Step S5d is YES, and Pattern F may be selected when the determination result of Step S5d is NO.

SEVENTH MODIFIED EXAMPLE

Patterns H to J, m=6, n=4

Figure 26:
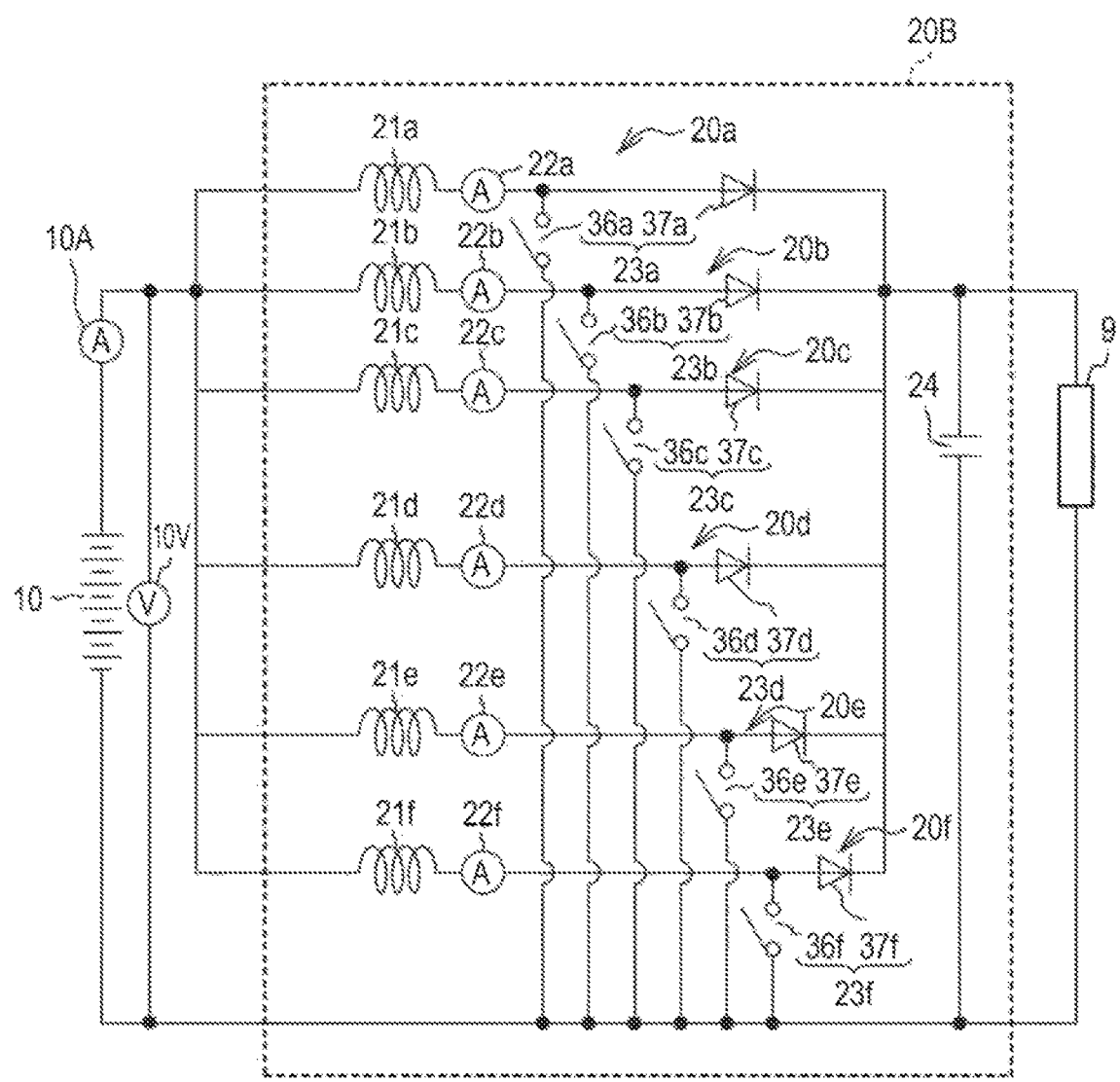
FIG. 26 is a diagram illustrating a circuit configuration of a step-up converter according to a seventh modified example.

FIG. 26 is a diagram illustrating a circuit configuration of an FDC 20B according to a seventh modified example. The FDC 20B includes converter circuits 20a to 20f of six phases. The converter circuit 20e includes a reactor 21e, a current sensor 22e, and an IPM 23e. The IPM 23e includes a SW 36e and a diode 37e. The converter circuit 20f includes a reactor 21f, a current sensor 22f, and an IPM 23f. The IPM 23f includes a SW 36f and a diode 37f. In the seventh modified example, one-phase driving is sequentially switched to six-phase driving with an increase in the input current of the FDC 20B, but the disclosure is not limited thereto and, for example, the driving may be switched in the order of two-phase driving, four-phase driving, and six-phase driving or may be switched in the order of at least four-phase driving and six-phase driving.

Figure 27:
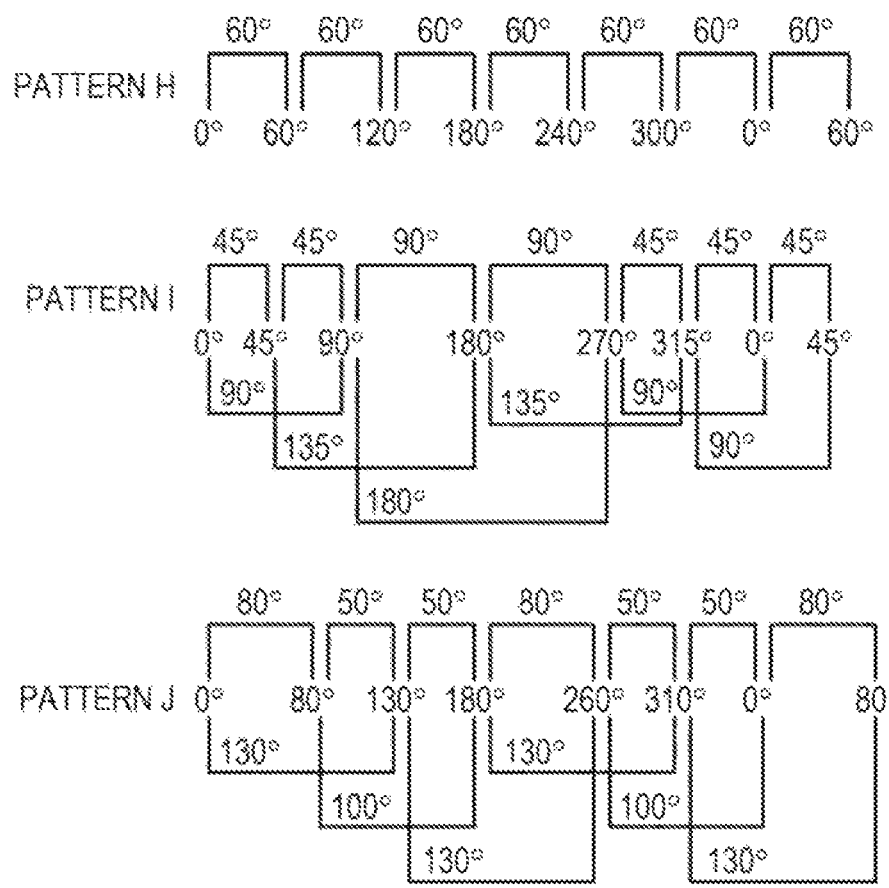
FIG. 27 is a diagram illustrating phases and phase differences in Patterns H to J.

FIG. 27 is a diagram illustrating phases and phase differences of Patterns H to J. The phases of the SWs 36a to 36f in Pattern H are 0°, 60°, 120°, 180°, 240°, and 300°, respectively. The phases of the SWs 36a to 36f in Pattern I are 0°, 45°, 90°, 180°, 270°, and 315°, respectively. The phases of the SWs 36a to 36f in Pattern J are 0°, 80°, 130°, 180°, 260°, and 310°, respectively. The phase differences in Pattern H are $D_{H(a-b)}=D_{H(b-c)}=D_{H(c-d)}=D_{H(d-e)}=D_{H(e-f)}=D_{H(f-a)}=60°$. The phase differences in Pattern I are $D_{I(a-b)}=D_{I(b-c)}=D_{I(c-f)}=D_{I(f-a)}=45°$ and $D_{I(c-d)}=D_{I(d-e)}=90°$. The phase differences in Pattern J are $D_{J(a-b)}=D_{J(d-e)}=80°$ and $D_{J(b-c)}=D_{J(c-d)}=D_{J(e-f)}=D_{J(f-a)}=50°$.

Which of Patterns H to J is suitable for four-phase driving can be identified as follows. All the phase differences in Pattern H are 60° and the maximum value thereof is 60°. The maximum value of the phase differences in Pattern I is 90°. The maximum value of the phase differences in Pattern J is 80°. The absolute value of a difference between the maximum value and 90° in Pattern H is 30°. The absolute value of a difference between the maximum value and 90° in Pattern I is 0°. The absolute value of a difference between the maximum value and 90° in Pattern J is 10°. Here, 90° is a value calculated by 360°/n=360°/4 and is a phase difference at which the ripple current is minimized at the time of four-phase driving. The absolute value is the least in Pattern I and the greatest in Pattern H. Accordingly, Pattern H is most suitable for six-phase driving, Pattern I is most suitable for four-phase driving, and Pattern J is not more suitable for six-phase driving but more suitable for four-phase driving than Pattern H, and is not more suitable for four-phase driving but more suitable for six-phase driving than Pattern I.

In Pattern J, the maximum value of the phase differences satisfies the following conditions.

$$60°(=360°/m=360°/6)<D_{J(a-b)}<90°(=360°/n=360°/4)$$

$$D_{J(a-b)}<D_{J(a-c)}<180°(=(360°/m)\times3=(360°/6)\times3)$$

Since $D_{J(a-b)}=80°$ and $D_{J(a-c)}=130°$, the above conditions are satisfied. On the other hand, in Patterns H and I, $D_{J(a-b)}=60°$, $60°<D_{H(a-b)}$ is not satisfied. $D_{I(c-d)}=90°$, and $D_{I(c-d)}<90°$ is not satisfied. Since these conditions are satisfied, Pattern J is not more suitable for six-phase driving but more suitable for four-phase driving than Pattern H, and is not more suitable for four-phase driving but more suitable for six-phase driving than Pattern I.

The switching elements of which on/off control is to be stopped at the time of four-phase driving based on Pattern I can be identified as follows. As illustrated in FIG. 27, in Pattern I, the phase difference $D_{I(a-c)}$ between the SW 36a and the SW 36c is 90°, the phase difference $D_{I(b-d)}$ between the SW 36b and the SW 36d is 135°, the phase difference $D_{I(c-e)}$ between the SW 36c and the SW 36e is 180°, the phase difference $D_{I(d-f)}$ between the SW 36d and the SW 36f is 135°, the phase difference $D_{I(c-a)}$ between the SW 36e and the SW 36a is 90°, and the phase difference $D_{I(f-b)}$ between the SW 36f and the SW 36b is 90°. Out of these phase differences, three phase differences $D_{I(a-c)}$, $D_{I(e-a)}$, and $D_{I(f-b)}$ have the same minimum value.

According to the above method, the switching elements of which on/off control is to be stopped at the time of four-phase driving based on Pattern I are three switching elements including the SW 36b which is turned on between the SW 36a and SW 36c, the SW 36f which is turned on between the SW 36e and SW 36a, and the SW 36a which is turned on between the SW 36f and SW 36b in six-phase driving. Here, the SWs 36a and 36b or the SWs 36f and 36a is a combination in which they are sequentially turned on at the time of six-phase driving. Accordingly, when on/off control of the SWs 36a and 36b is stopped at the time of four-phase driving, the phase difference between the SW 36f and the SW 36c which is subsequently turned on increases. Similarly, when on/off control of the SWs 36f and 36a is stopped, the phase difference between the SW 36e and the SW 36b which is subsequently turned on increases. Accordingly, as the switching elements of which on/off control is to be stopped at the time of four-phase driving, on/off control of the SWs 36b and 36f which is other than the combination of two switching elements which are sequentially turned on at the time of six-phase driving is stopped. By stopping on/off control of the SWs 36b and 36f at the time of four-phase driving, the phase differences in four-phase driving based on Pattern I are all 90° and it is possible to curb the ripple current of the output current IT.

The switching elements of which on/off control is to be stopped at the time of four-phase driving based on Pattern J can be identified as follows. As illustrated in FIG. 27, in Pattern J, the phase difference $D_{J(a-c)}$ between the SW 36a and the SW 36c is 130°, the phase difference $D_{J(b-d)}$ between the SW 36b and the SW 36d is 100°, the phase difference $D_{J(c-e)}$ between the SW 36c and the SW 36e is 130°, the phase difference $D_{J(d-f)}$ between the SW 36d and the SW 36f is 130°, the phase difference $D_{J(e-a)}$ between the SW 36e and the SW 36a is 100°, and the phase difference $D_{J(f-b)}$ between the SW 36f and the SW 36b is 130°. Out of these phase differences, two phase differences $D_{J(b-d)}$ and $D_{J(e-a)}$ have the same minimum value. Accordingly, the switching elements of which on/off control is to be stopped are the SWs 36c and which is turned on between the SW 36b and the SW 36d which define the minimum phase difference and the SW 36f which is turned on between the SW 36e and the SW 36a. Here, in Pattern J, unlike Pattern I, the SW 36c and the SW 36f are not two switching elements which are sequentially turned on at the time of six-phase driving. Accordingly, by stopping on/off control of the SW 36c and the SW 36f at the time of four-phase driving based on Pattern J, it is possible to curb the ripple current in four-phase driving. Accordingly, the phase differences at the time of four-phase driving based on Pattern J are $D_{J(a-b)}=D_{J(d-e)}=80°$ and $D_{J(b-d)}=D_{J(e-a)}=100°$. In this case, it is possible to further decrease the ripple current in comparison with a case in which a combination of two switching elements other than the combination of SWs 36c and 36f is stopped.

At the time of four-phase driving based on Pattern H, two arbitrary switching elements other than two switching elements which are sequentially turned on at the time of six-phase driving out of the SWs 36a to 36f have only to be stopped. This is because all the phase differences in Pattern H are the same.

For example, in the seventh modified example, as illustrated in FIG. 18, Pattern H may be selected when the determination result of Step S5c is YES, Pattern J may be selected when the determination result of Step S5d is YES, and Pattern I may be selected when the determination result of Step S5d is NO.

In the seventh modified example, switching elements which are not the combination of two switching elements which are sequentially turned on at the time of six-phase driving are identified as the switching elements of which on/off control is to be stopped at the tune of four-phase driving based on Pattern I. However, since on/off control of only one switching element can be stopped at the time of two-phase driving in the FDC 20 which is of a three-phase type as in the above embodiment, the above consideration does not need to be performed. Similarly, since on/off control of only one switching element can be stopped at the tune of three-phase driving in the FDC 20A which is of a four-phase type as in the sixth modified example, the above consideration does not need to be performed. That is, when (m-n)=1. the above consideration does not need to be performed.

In Pattern I of the seventh modified example, three phase differences $D_{I(a-c)}$, $D_{I(c-a)}$, and $D_{I(f-b)}$ out of $D_{I(a-c)}$, $D_{I(b-d)}$, $D_{I(c-e)}$, $D_{I(d-f)}$, $D_{I(e-a)}$, and $D_{I(f-b)}$ have the same minimum value, but are not limited to the same value. For example, when the phase difference $D_{I(a-c)}$ out of these phase differences is the minimum, the phase difference $D_{I(f-b)}$ is the second minimum, and the phase difference $D_{I(c-a)}$ is the third minimum, it is considered that on/off control of the SWs 36a and 36b is stopped because $D_{I(a-c)}$ is the minimum and $D_{I(f-b)}$ is the second minimum. However, since these two switching elements correspond to two switching elements which are sequentially turned on at the time of six-phase driving, on/off control of the SWs 36b and 36f is stopped based on the less phase difference $D_{I(c-a)}$ other than the minimum phase differences $D_{I(a-c)}$ and $D_{I(f-b)}$.

In Pattern J, two phase differences $D_{J(b-d)}$ and $D_{J(e-a)}$ are the same minimum value, but are not limited to the same value.

In the embodiment and the modified examples, a case in which the converter circuits 20a to 20c of three phases are provided, a case in which the converter circuits 20a to 20d of four phases are provided, and a case in which the converter circuits 20a to 20f of six phases are provided have been described, but the number of phases of the converter circuits is not limited thereto.

In the embodiment and the modified examples, a step-up converter has been exemplified, but a step-down converter, a step-up/down converter, or a bidirectional converter may be employed. In the embodiment and the modified examples, an example in which one switching element is provided for each one-phase converter circuit has been described, but the disclosure is not limited thereto and a plurality of switching elements may be provided for each one-phase converter circuit. For example, like a bidirectional converter in which two switching elements are provided for each phase, a configuration in which on/off control of one switching element is performed and the other switching element is kept normally on or normally off in a step-up mode and one switching clement is kept normally off or normally on and on/off control of the other switching element is performed in a step-down mode may be employed. When operation of a converter circuit in which a plurality of switching elements is provided in this way is stopped. on/off control of all the switching elements thereof is stopped and kept off. When the converter circuit is driven, on/off control of at least one switching element is performed.

In the embodiment and the modified examples, the ECU 4 that comprehensively controls the fuel cell system 1 mounted in the vehicle as a whole has been described as an example of a control device that controls the FDC 20, but the disclosure is not limited thereto and, for example, a computer which is provided separately from the ECU 4, which controls the FDC 20, and which includes a CPU, a ROM, and a RAM may be employed.

In the embodiment and the modified examples, the fuel cell system 1 mounted in the vehicle has been described as an example of a power supply system, but the disclosure is not limited thereto and a stationary fuel cell system may be employed. For example, in a stationary fuel cell system, a predicted current value may be predicted depending on seasons in which an amount of generated electric power or a power generation time of a fuel cell varies. In fuel cell systems for commercial facilities, for example, it is considered that the amount of electric power generated in the fuel cell increases in the daytime due to cooling or the like and the predicted current value of the FDC increases in the summer and the amount of electric power generated in the fuel cell increases in the nighttime due to a heating mechanism or the like and the predicted current value for the FDC increases in the winter. In a fuel cell system for home, a pattern may be selected based on history information on a time in which control in n-phase driving is performed and a time in which control in m-phase driving is performed. In such a fuel cell system for home, the drive mode may be switched to a normal drive mode or a silent mode in which the amount of generated electric power is curbed than in the normal drive mode to curb noise in the nighttime manually by a user or automatically. For example, in this case, as illustrated in FIG. 14, Pattern A may be selected while the FDC is stopped when the normal mode is selected and Pattern B may be selected while the FDC is stopped when the silent mode is selected.

In the above embodiment, the FC 10 which is a solid polymer fuel cell is used as the power supply, but a fuel cell other than a solid polymer fuel cell may be used or a secondary battery such as a lithium-ion battery or a nickel-hydride battery may be used.

While an embodiment of the disclosure has been described above in detail, the disclosure is not limited to such a specific embodiment and can be modified in various forms without departing from the gist of the disclosure described in the appended claims.

What is claimed is:

1. A control device for a multi-phase converter including converter circuits of m (where m is an integer equal to or greater than 3) phases of which each includes a switching element and which are connected in parallel to each other, the control device comprising:

a driven phase number control unit configured to increase the number of driven phases of the converter circuits by increasing the number of switching elements on which on/off control is performed as a current value input to the multi-phase converter increases and to control the multi-phase converter in n-phase driving in which the number of driven phases is n (where n is an integer less than m and equal to or greater than 2 and is an integer other than a divisor of m) or m-phase driving in which the number of driven phases is m;

a storage unit configured to store first and second patterns which are phase patterns in which timings of the switching elements of m phases are defined:

a selection unit configured to select the first or second pattern while the multi-phase converter is stopped;

an on/off control unit configured to perform the on/off control on the switching elements of the number of driven phases based on the phases defined in the selected first or second pattern on a condition that a period and a duty ratio are substantially the same; and
a prediction unit configured to predict a predicted correlation value which is correlated with a time ratio which is a ratio of a time in which control in the m-phase driving is predicted to be performed to a time in which control in the n-phase driving is predicted to be performed in a predetermined time,
wherein an absolute value of a difference between a maximum value of a phase difference between two switching elements which are defined to be sequentially turned on in the n-phase driving based on the second pattern and 360°/n is less than an absolute value of a difference between a maximum value of a phase difference between two switching elements which are defined to be sequentially turned on in the n-phase driving based on the first pattern and 360°/n,
wherein the selection unit is configured to select the first pattern when the predicted correlation value indicates that the time ratio is equal to or greater than a first threshold value and to select the second pattern when the predicted correlation value indicates that the time ratio is less than a second threshold value equal to or less than the first threshold value,
wherein the on/off control unit is configured to stop on/off control on the switching elements of (m-n) phases in the n-phase driving based on the second pattern,
wherein the switching elements are classified into a plurality of combinations such that each of the combinations is composed of three switching elements that are defined to be sequentially turned on in the m-phase driving based on the second pattern,
when (m-n)=1, the switching element of (m-n) phase on which the on/off control is stopped in the n-phase driving based on the second pattern is the switching element which is turned on between the switching element which is firstly turned on and the switching element which is finally turned on out of the three switching elements in a combination having a phase difference that is smallest among the plurality of combinations, the phase difference being a phase difference between the switching element which is firstly turned on and the switching element which is finally turned on, and
when (m-n)≥2, the switching elements of (m-n) phases on which the on/off control is stopped in the n-phase driving based on the second pattern are switching elements that are other than a combination of two switching elements which are defined to be sequentially turned on in the m-phase driving based on the second pattern, and that are each turned on between the switching element which is firstly turned on and the switching element which is finally turned on out of the three switching elements in a corresponding one of (m-n) combinations out of the plurality of combinations, the (m-n) combinations being selected in ascending order of the phase difference between the switching element which is firstly turned on and the switching element which is finally turned on.

2. The control device according to claim 1, wherein the second threshold value is equal to the first threshold value.

3. The control device according to claim 1, wherein the second threshold value is less than the first threshold value, wherein the storage unit is configured to store a third pattern which is a phase pattern in which on timings of the m switching elements are defined and which is not the first and second patterns,
wherein the selection unit is configured to select the first pattern while the multi-phase converter is stopped when the predicted correlation value indicates that the time ratio is equal to or greater than the first threshold value, to select the second pattern while the multi-phase converter is stopped when the predicted correlation value indicates that the time ratio is less than the second threshold value, and to select the third pattern while the multi-phase converter is stopped when the predicted correlation value indicates that the time ratio is less than the first threshold value and equal to or greater than the second threshold value,
wherein an absolute value of a difference between a maximum value of a phase difference between two switching elements which are defined to be sequentially turned on in the n-phase driving based on the third pattern and 360°/n is greater than an absolute value of a difference between a maximum value of a phase difference between two switching elements which are defined to be sequentially turned on in the n-phase driving based on the second pattern and 360°/n and less than the absolute value of the difference between the maximum value of the phase difference between two switching elements which are defined to be sequentially turned on in the n-phase driving based on the first pattern and 360°/n,
wherein the on/off control unit is configured to stop on/off control on the switching elements of (m-n) phases in the n-phase driving based on the third pattern,
wherein the switching elements are classified into a plurality of combinations such that each of the combinations is composed of three switching elements that are defined to be sequentially turned on in the m-phase driving based on the third pattern,
when (m-n)=1, the switching element of (m-n) phase on which the on/off control is stopped in the n-phase driving based on the third pattern is the switching element which is turned on between the switching element which is firstly turned on and the switching element which is finally turned on out of the three switching elements in a combination having a phase difference that is smallest among the plurality of combinations, the phase difference being a phase difference between the switching element which is firstly turned on and the switching element which is finally turned on, and
when (m-n)≥2, the switching elements of (m-n) phases on which the on/off control is stopped in the n-phase driving based on the third pattern are switching elements that are other than a combination of two switching elements which are defined to be sequentially turned on in the m-phase driving based on the third pattern, and that are each turned on between the switching element which is firstly turned on and the switching element which is finally turned on out of the three switching elements in a corresponding one of (m-n) combinations out of the plurality of combinations, the (m-n) combinations being selected in ascending order of the phase difference between the switching element which is firstly turned on and the switching element which is finally turned on.

4. The control device according to claim 1, wherein, out of the first, second, and third switching elements which are sequentially turned on in the m-phase driving based on at least one of the first and second patterns, a phase difference between the first switching element and the second switching element is greater than 360°/m and less than 360°/n and a phase difference between the first switching element and the third switching element is less than (360°/m)×3.

5. The control device according to claim 1, further comprising a route acquiring unit configured to acquire scheduled travel route information on a scheduled travel route of a vehicle which travels using a battery that supplies an input current to the multi-phase converter as a power source,
wherein the prediction unit is configured to predict a predicted current value which the battery is predicted to supply to the multi-phase converter as the predicted correlation value based on the scheduled travel route information.

6. The control device according to claim 1, further comprising a history acquiring unit configured to acquire history information on a time in which control in the n-phase driving is performed and a time in which control in the m-phase driving is performed,
wherein the prediction unit is configured to predict the predicted correlation value based on the history information.

7. The control device according to claim 1, further comprising a drive mode acquiring unit configured to acquire drive mode information on a drive mode of a vehicle which travels using a battery that supplies an input current to the multi-phase converter as a power source,
wherein the prediction unit is configured to predict the predicted correlation value based on the drive mode information.

8. A multi-phase converter system comprising:
the control device according to claim 1; and
the multi-phase converter.

9. A power supply system comprising:
the multi-phase converter system according to claim 8; and
a power supply configured to supply an input current to the multi-phase converter.

10. The power supply system according to claim 9, wherein the power supply is a fuel cell.

* * * * *